US006685000B2

(12) United States Patent
Sugata et al.

(10) Patent No.: US 6,685,000 B2
(45) Date of Patent: Feb. 3, 2004

(54) COIN DISCRIMINATION METHOD AND DEVICE

(76) Inventors: Masanori Sugata, Saitama (JP); Akira Onodera, Kawagoe (JP)

( * ) Notice: Subject to any disclaimer, the term of this patent is extended or adjusted under 35 U.S.C. 154(b) by 110 days.

(21) Appl. No.: 09/859,151

(22) Filed: May 16, 2001

(65) Prior Publication Data

US 2002/0005329 A1 Jan. 17, 2002

(30) Foreign Application Priority Data

May 31, 2000 (JP) ....................................... 2000-163378
May 19, 2000 (JP) ....................................... 2000-148224
May 19, 2000 (JP) ....................................... 2000-148225

(51) Int. Cl.[7] .............................. G07D 5/00; G06T 1/00
(52) U.S. Cl. ....................... 194/328; 194/302; 194/318; 194/334
(58) Field of Search ................................ 194/302, 303, 194/317, 318, 319, 328, 330, 334

(56) References Cited

U.S. PATENT DOCUMENTS 3,921,003 A * 11/1975 Greene ....................... 194/328
4,644,148 A * 2/1987 Kusaka et al. .............. 396/113
4,899,392 A * 2/1990 Merton ....................... 194/302
5,033,602 A * 7/1991 Saarinen et al. ............ 194/302
5,133,019 A * 7/1992 Merton et al. .............. 194/302
5,236,074 A * 8/1993 Gotaas ....................... 194/331
5,433,310 A * 7/1995 Bell ........................... 194/318
5,538,123 A * 7/1996 Tsuji .......................... 194/303

FOREIGN PATENT DOCUMENTS

JP 405020521 * 1/1993
JP 405046840 * 2/1993 ................ 194/328
JP 08-180235 3/1993
JP 06/274736 12/1994
JP 408016869 * 1/1996
JP 08147523 * 6/1996
JP 408180235 * 7/1996
JP 410063852 * 3/1998
JP 10091837 * 4/1998

* cited by examiner

*Primary Examiner*—Christopher P. Ellis
*Assistant Examiner*—Paul T. Chin

(57) ABSTRACT

A coin discrimination method and device reliably acquires stable two-dimensional images of the surfaces of coins, and using the acquired two-dimensional images is able to perform discrimination, reliably and at high speed, between genuine and counterfeit coins, and between coin types. In a coin pathway configured so as to block interfering light, sensors are positioned at an image-capture position and at a position upstream from the image-capture position; an image sensor is caused to begin image capture simultaneously with the detection, by the sensor upstream of the image-capture position, of a coin, and illumination is emitted for a short time simultaneously with the detection, by the sensor at the image-capture position, of the coin, to acquire an image of the coin. Specific patterns are detected in a binary image obtained by converting the acquired image to binary level, and coin discrimination is performed based on the detected patterns.

16 Claims, 34 Drawing Sheets

COIN DISCRIMINATION METHOD AND DEVICE

BACKGROUND OF THE INVENTION

1. Field of the Invention

This invention concerns a coin discrimination method and device, and in particular concerns a coin discrimination method and device to perform discrimination of genuine and counterfeit coins and of coin types, based on the pattern of the surface and other parts of the coin.

2. Description of the Related Art

Coin discrimination devices used in automatic vending machines and similar generally employ a sensor using a magnetic coil to detect the material, outer diameter, surface pattern and other parameters of a coin to discriminate among coins. The detection signals output from this sensor are concentrated in a basic pattern representing the characteristics of the coin; by comparing this basic pattern with basic patterns established in advance, the genuine or counterfeit nature of the coin, and the coin type, are discriminated.

However, recently there have appeared altered coins which are foreign coins, similar in material and shape, and machined such that the magnetic pattern matches that obtained from genuine coins; as the machining precision of these altered coins increases, it has become more difficult to discriminate between genuine and counterfeit coins by means of a magnetic sensor.

Consequently there is increasing demand for coin discrimination devices which use optical sensors or similar to capture a two-dimensional image of the coin surface, and perform pattern matching of the captured two-dimensional image with known coin patterns to perform coin discrimination.

However, when an image sensor captures the image of the surface of a coin which moves by rolling at high speed along a coin pathway, the image of the surface of the coin is blurred, and there have been such problems as an inability to obtain a clear two-dimensional image sufficient for coin discrimination, and difficulties in clearly capturing, over the entire face of the coin, a pattern formed only from slight protrusions and depressions on the coin surface.

Further, the captured two-dimensional image of the coin surface is a rotated image due to the rotation of the coin; when performing pattern matching, the rotation angle of the acquired two-dimensional image must be detected and corrected, and so there is the problem that processing time is lengthened.

As technology to resolve such problems, the "coin discrimination device" described in Japanese Patent Application Laid-open No. 8-180235, and the "currency discrimination device" described in Japanese Patent Application Laid-open No. 6-274736, and similar have been proposed.

SUMMARY OF THE INVENTION

An object of the present invention is to provide a coin discrimination method and device which enable the stable and reliable capture of the image of a coin surface, and which are capable of competent discrimination processing of the coin using a two-dimensional image of the coin surface.

In order to achieve the above object, the invention comprises a coin discrimination method for discriminating coins which roll along a coin pathway, wherein, when the coin reaches a prescribed position of the coin pathway, a surface or an edge of the coin is illuminated with light, a still image of the illuminated surface or edge is captured, and based on the captured still image, discrimination of the coin is performed.

The invention also comprises a coin pathway as a light-blocking space.

The invention also comprises a still image which is captured by a two-dimensional image sensor.

The invention also comprises a two-dimensional image sensor as a MOS-type image sensor.

The invention also comprises an image capture means which begins the image capture operation in advance, before the coin reaches the prescribed position.

The invention also comprises image information which corresponds to a pattern on a top side or on a bottom side of a coin to be discriminated, which rolls along a coin pathway, is captured, and the coin to be discriminated is discriminated based on the captured image information; wherein the image information for the top side or the bottom side of the coin to be discriminated is separated into areas set in advance, a specific pattern is extracted from one of the separated areas, and based on the extracted specific pattern, a judgment is made as to whether the coin to be discriminated is a prescribed coin or not.

The invention also comprises image information which is a binary image, in which a pattern based on the pattern of the top side or the bottom side of the coin to be discriminated is drawn in white or in black, and the separation is performed by drawing separation lines of a prescribed width, in a color opposite the pattern color, in preset positions of an image representing the image information.

The invention also comprises separation lines, being circles having the same center as the coin to be discriminated.

The invention also comprises image information which corresponds to an image which has been corrected for rotation such that the coin to be discriminated faces a prescribed reference direction, and the separation lines are straight lines.

The invention further comprises a coin discrimination method in which image information corresponding to a pattern of a top side or a bottom side of a coin to be discriminated, rolling along a coin pathway, is captured, and the coin to be discriminated is discriminated based on the captured image information; wherein at least two specific patterns are extracted from the image information of the top side or the bottom side of the coin to be discriminated, and using a relative positional relation between the extracted specific patterns as a characteristic quantity, discrimination of the coin to be discriminated is performed.

The invention further comprises a characteristic quantity which includes a distance between centers of gravity of the respective extracted specific patterns.

The invention also comprises a characteristic quantity which includes angles formed by line segments connecting a center of the coin to be discriminated, and centers of gravity of each of the specific patterns.

The invention also comprises specific patterns that are extracted from binary images obtained by conversion of the image information to binary level.

The invention also comprises image information which is separated into a plurality of patterns, and the specific patterns are extracted based on areas of each of the separated patterns.

The invention also comprises image information that is separated into a plurality of patterns, and the specific patterns are extracted based on distances between centers of gravity of each separated pattern and a center of the coin to be discriminated in the image information.

The invention also comprises a distance between centers of gravity of the specific patterns that is normalized based on a radius of the coin to be discriminated in the image information, and discrimination of the coin to be discriminated is performed using this normalized distance as the characteristic quantity.

The invention may comprise a coin discrimination device for discriminating a coin rolling along a coin pathway, comprising illumination means, placed at a prescribed position on the coin pathway, for illuminating with light for a short time a surface or an edge of the coin rolling along the coin pathway; image-capture means for capturing an image of the surface or edge of the coin, illuminated with light from the illumination means; image-capture start indication means, for indicating a start of image capture to the image-capture means in advance, before the coin reaches a image-capture position of the image-capture means; and, light emission indication means, for indicating a start of illumination of light to the illumination means when the coin reaches the image-capture position of the image-capture means.

The invention also may comprise an image-capture start indication means that comprises a first sensor, positioned on an upstream side of the illumination means on the coin pathway, and the light emission indication means comprises a second sensor, positioned corresponding to the image-capture means.

The invention also may include a coin pathway which constitutes a light-blocking space.

The invention also may include an image-capture means which is a two-dimensional image sensor.

The invention also may include a two-dimensional image sensor that is a MOS-type image sensor.

The invention also may comprise a coin discrimination device which acquires image information corresponding to a pattern of a top side or a bottom side of a coin to be discriminated which rolls along a coin pathway, and discriminates the coin to be discriminated based on the acquired image information, comprising: separation means for separating the image information for the top side or the bottom side of the coin to be discriminated into areas set in advance; specific pattern extraction means for extracting specific patterns from among any of areas separated by the separation means; and judgment means for comparing specific patterns extracted by the specific pattern extraction means with reference values, and for judging whether or not the coin to be discriminated is a prescribed coin.

The invention also may comprise image information as a binary image, in which a pattern based on the pattern of the top side or the bottom side of the coin for discrimination is drawn in white or in black, and the separation means separates the pattern by drawing separation lines of a prescribed width, in the color opposite the pattern color, in preset positions in the binary image.

The invention also may include structure wherein the separation means draws, in the image, circles having the same center as the coin for discrimination as the separation lines.

The invention also may comprise a structure wherein the image information corresponds to an image subjected to rotation correction such that the coin to be discriminated faces a prescribed reference direction, and the separation means draws on the image straight lines as separation lines.

The invention also may comprise a coin discrimination device, in which image information corresponding to a pattern on a top side or a bottom side of a coin to be discriminated, rolling along a coin pathway, is acquired, and the coin to be discriminated is discriminated based on the acquired image information, comprising: specific pattern extraction means for extracting specific patterns from image information for the top side or the bottom side of the coin for discrimination; pattern-to-pattern distance computation means for computing a distance between at least two specific patterns extracted by the specific pattern extraction means; and judgment means for judging the coin for discrimination based on the distance calculated by the pattern-to-pattern distance computation means.

The invention also may comprise a pattern-to-pattern distance computation means which computes the distance between centers of gravity of the respective specific patterns extracted by the specific pattern extraction means.

The invention also may comprise angle computation means for computing angles formed by a plurality of line segments joining each of centers of gravity of at least two specific patterns extracted by the specific pattern extraction means with a center of the coin to be discriminated in the image information, and wherein the judgment means judges the coin to be discriminated based on the angles computed by the angle computation means.

The invention also may include a specific pattern extraction means which comprises image conversion means for converting to binary level the image information for the top side or the bottom side of the coin to be discriminated, and the image conversion means extracts the specific patterns from the binary-level image.

The invention also may include a specific pattern extraction means which comprises pattern separation means for separating the image information into a plurality of patterns, and area computation means for computing an area of each pattern separated by the pattern separation means; and patterns, areas of which as computed by the area computation means are within a range set in advance, are extracted as the specific patterns.

The invention also may include a specific pattern extraction means which comprises pattern separation means for separating the image information into a plurality of patterns, and position specification means for specifying positions of patterns separated by the pattern separation means based on a distance between center of gravity of the patterns and a center of the coin to be discriminated in the image information; and patterns, positions of which as specified by the position specification means are within a range set in advance, are extracted as the specific patterns.

The invention may also include normalization means for normalizing the distance between the specific patterns based on a radius of the coin to be discriminated in the image information, and wherein the judgment means judges the coin to be discriminated based on comparison of the distance normalized by the normalization means with a reference value.

By means of this invention, the coin pathway is configured such that light is blocked and there is illumination by light for a short time when the coin reaches the image-capture position, and in addition, the image sensor is caused to begin image capture in advance before the coin reaches the image-capture position. Hence the image of the surface of the coin rolling at high speed can be captured in a manner close to the stationary state, and an image free of omissions can be captured.

Separation lines set in advance are drawn on a binary image acquired from the top side or from the bottom side of the coin, arranged so as to separate the pattern; hence linking of patterns by various factors can be prevented, without changing the conditions for binary-level conversion.

Further, the device is configured such that a plurality of prescribed patterns are detected from the image of the top side or of the bottom side of the coin, and the coin is discriminated based on the distance between the centers of gravity of each of the detected patterns, so that discrimination of the coin can be performed without correcting for the rotation angle of the image of the rolling coin.

DESCRIPTION OF THE PREFERRED EMBODIMENTS

Below, one aspect of the coin discrimination method and device of this invention is explained in detail, referring to the attached drawings.

Figure 1:
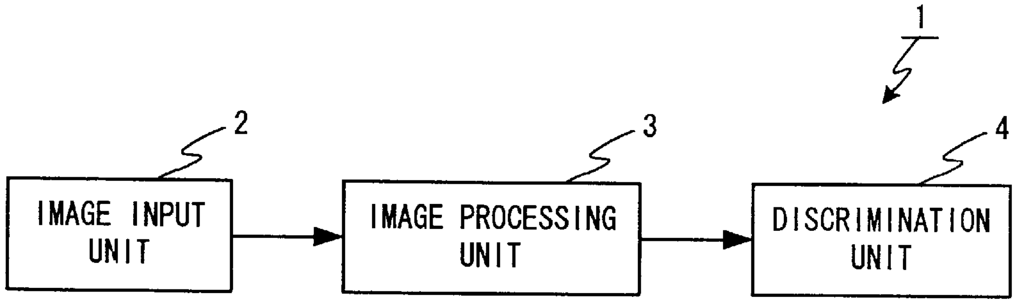
FIG. 1 is a block diagram showing the schematic configuration of a coin discrimination device to which this invention is applied.

FIG. 1 is a block diagram showing the schematic configuration of a coin discrimination device to which this invention is applied.

As shown in the figure, the coin discrimination device 1 comprises an image input unit 2, image processing unit 3, and discrimination unit 4. The image input unit 2 captures an image of the coin rolling in the coin pathway, and acquires a stationary image of the coin surface or similar. The image processing unit 3 executes image processing, including conversion to binary level of the still image acquired by the image input unit 2. The discrimination unit 4 discriminates between genuine and counterfeit coins and between coin types for the coin the image of which is captured, based on the still image resulting from image processing by the image processing unit 3.

Figure 2:
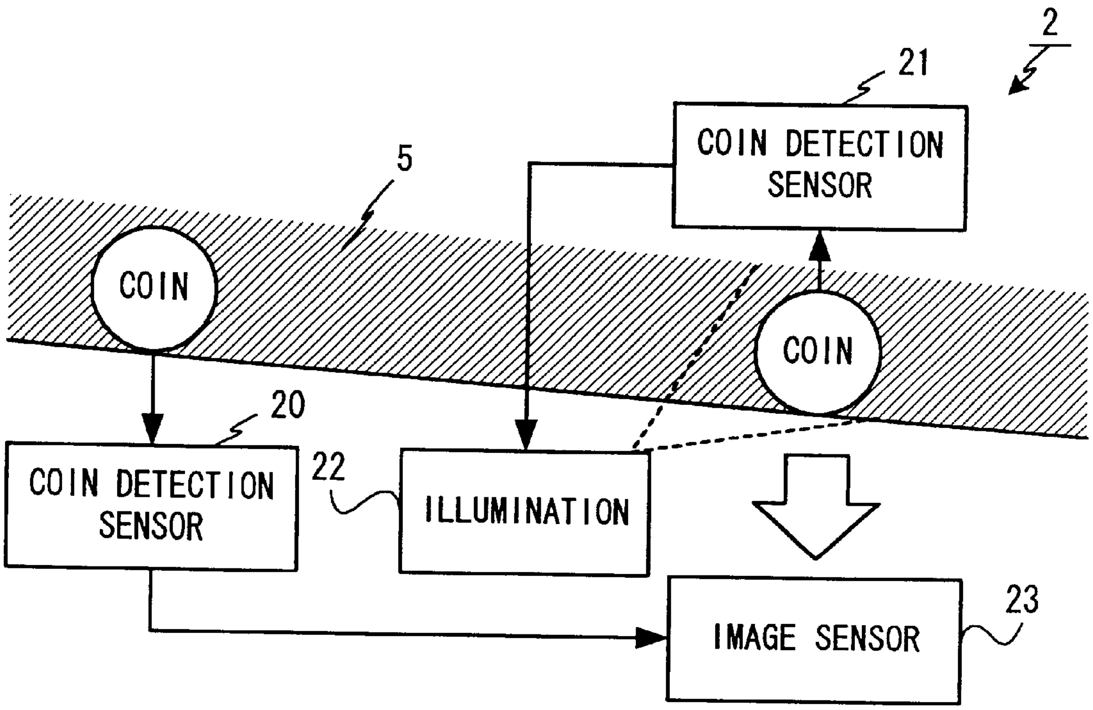
FIG. 2 is a figure showing the configuration of the image input unit 2.

Next, the image input unit 2 is explained in detail, referring to FIG. 2. FIG. 2 is a figure showing the configuration of the image input unit 2.

As this figure indicates, the image input unit 2 comprises a coin detection sensor 20 and coin detection sensor 21, illumination 22, and image sensor 23. These components are positioned at the coin pathway 5. The coin pathway 5 is constructed using light-blocking material such that interfering light is blocked.

The coin detection sensor 20 detects a coin rolling along the coin pathway 5 as it passes a prescribed position upstream of the image-capture position; the coin detection sensor 21 detects the arrival of this coin at the image-capture position. As these coin detection sensors 20, 21, magnetic excitation sensors can for example be employed.

The illumination 22 illuminates the surface of the coin with light uniformly from all directions for a short time when the coin detection sensor 21 detects the coin.

As the image sensor 23, a MOS-type image sensor or other two-dimensional image sensor is used; the image sensor starts image capture when the coin detection sensor 20 detects a coin. The image captured by the image sensor 23 is output to the later-stage image processing unit 3.

Here, the operation of a two-dimensional image sensor adopted as the image sensor 23 is briefly explained.

Figure 3:
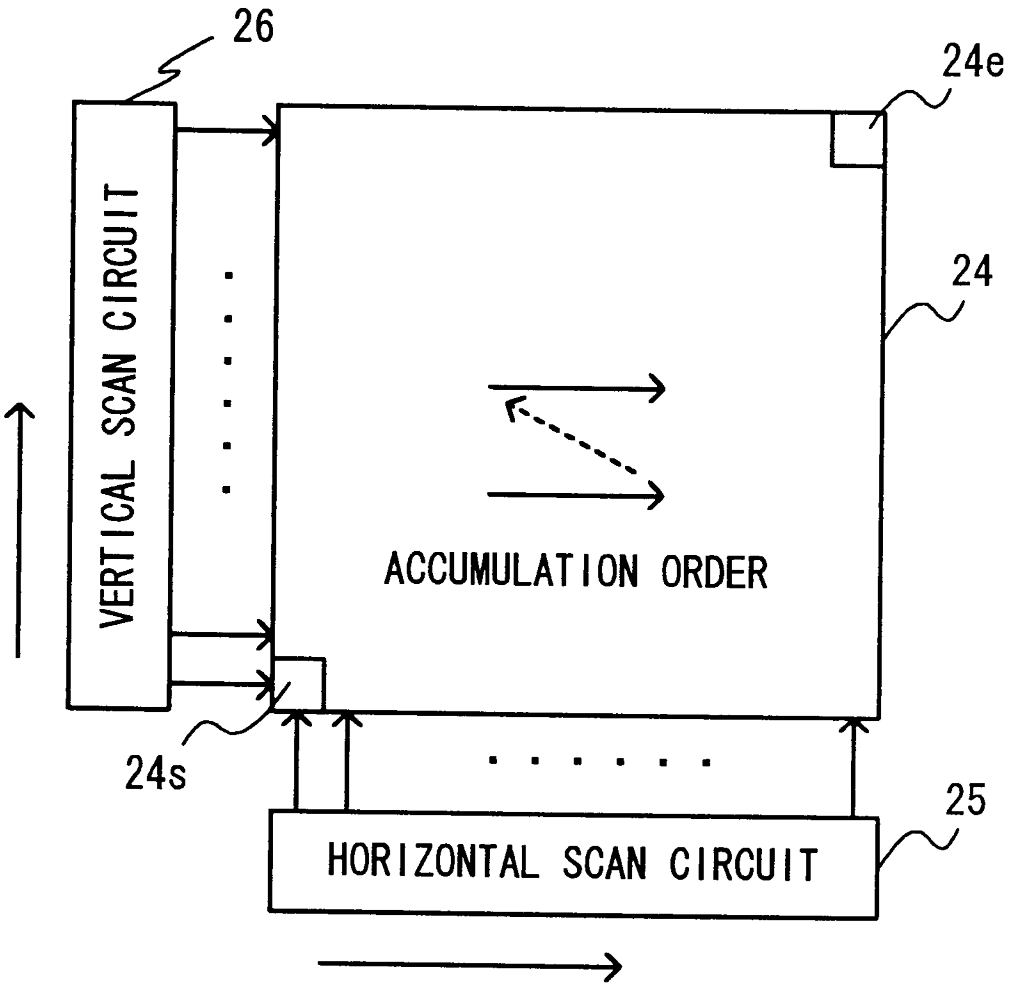
FIG. 3 is a figure showing the schematic configuration of a MOS-type image sensor.
Figure 4:
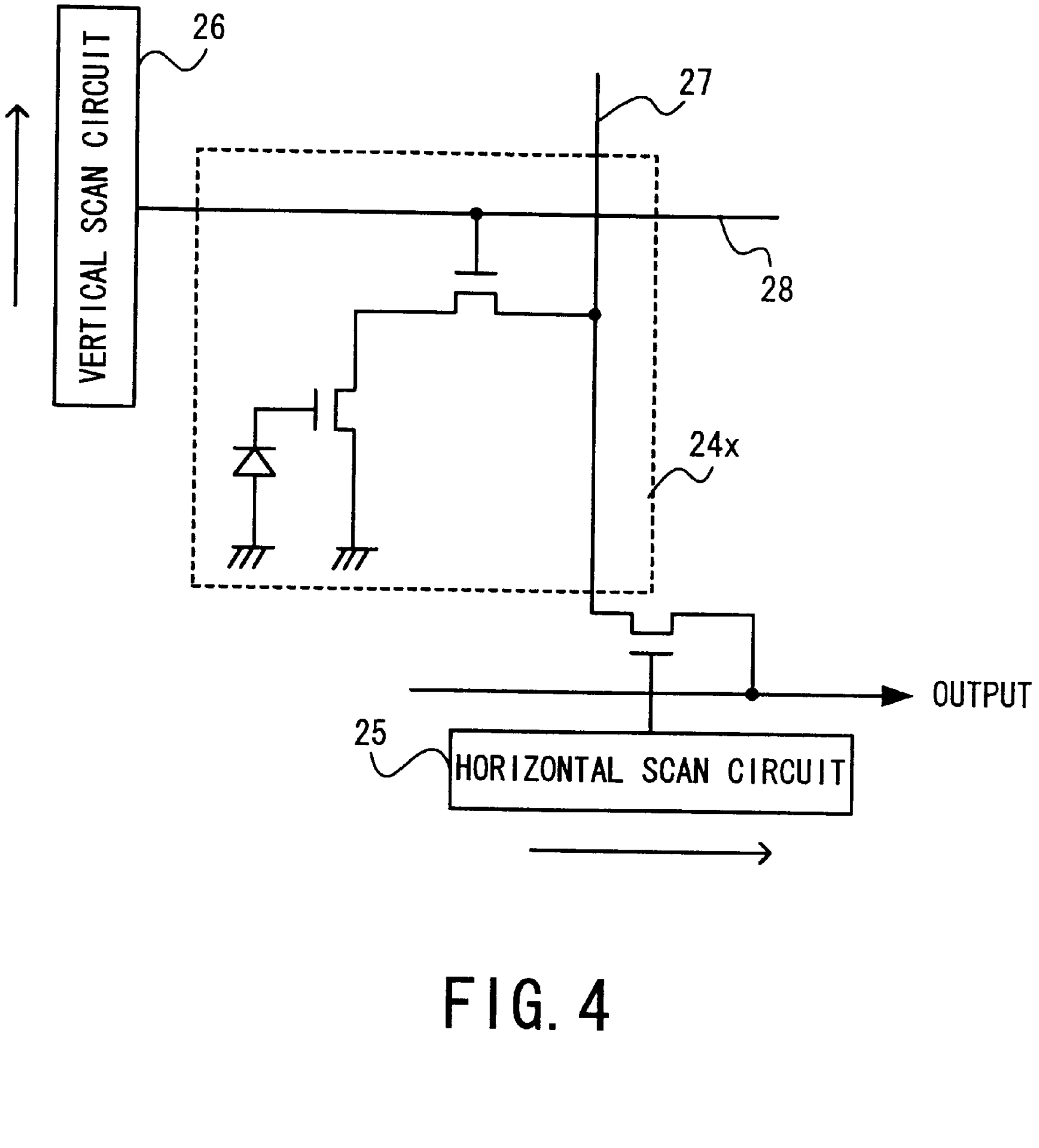
FIG. 4 is a figure showing the detailed circuitry of a unit pixel comprised by the pixel array 24 in FIG. 3.

FIG. 3 is a figure showing the schematic configuration of a MOS-type image sensor; FIG. 4 is a figure showing the detailed circuitry of a unit pixel comprised by the pixel array 24 in FIG. 3.

In FIG. 3, the MOS-type image sensor performs operations to prepare for image capture of the individual pixels comprised by the pixel array 24 by selecting the pixel 24*x* (one of the pixels comprised by the pixel array 24) by means of the orthogonal X-address line 27 and Y-address line 28 (cf. FIG. 4), controlled by the horizontal scan circuit 25 and vertical scan circuit 26, which are one type of shift register.

Hence operations to prepare for image capture for each pixel are not begun simultaneously for all pixels, but are begun for each pixel selected in succession by the X-address 27 and Y-address 28; in FIG. 3, operations to prepare for image capture are begun in succession from the first pixel 24*s*.

For this reason, the time from the start of preparatory operations for image capture for the first pixel 24*s* to the completion of preparatory operations for image capture for the last pixel 24*e* (the image capture preparation time) is determined by the operation clock (accumulation clock) of the horizontal scan circuit 25 and vertical scan circuit 26 and by the total number of pixels in the pixel array 24.

The image input unit 2 emits light for a short time only when the coin, rolling at high speed, reaches the image-capture position in the coin pathway 5, which is configured such that incident interfering light is blocked; during the interval of illumination, an image of the coin surface is captured, enabling the acquisition of an image of the coin surface close to the stationary state.

However, due to the characteristics of operation of the above-described image sensor 23, if image capture is begun when the coin reaches the image-capture position and is illuminated with light, the image capture will be too late. That is, the illumination with light takes place before image-capture preparations are completed for all the pixels of the image sensor 23, and so the part of the image data corresponding to pixels for which image-capture preparations are not complete is lacking.

Consequently, image-capture operations for the image sensor 23 are begun in advance, before the coin for discrimination reaches the image-capture position, based on the output signal of a coin detection sensor 20 provided upstream of the image-capture position.

Because the coin pathway 5 is in a darkened state, with interfering light blocked, no image can be incident on the image sensor 23 while the illumination 22 is extinguished.

The coin detection sensor 20 is positioned on the coin pathway 5 such that, when a coin rolls along the coin pathway at the maximum anticipated velocity, the time from detection of the coin by the coin detection sensor 20 to the arrival of the coin at the image-capture position is longer than the time for image-capture preparation by the image sensor 23. That is, it is prepared such that image-capture preparations are completed for the last pixel of the image sensor 23 before the coin reaches the image-capture position in what is anticipated to be the shortest time required from detection by the coin detection sensor 20 to arrival at the image-capture position.

The accumulation time for each pixel after the completion of image-capture preparations for the last pixel 24*e* of the image sensor 23 is set by subtracting the time for image-capture preparations from the time between detection of the coin by the coin detection sensor 20 and arrival at the image-capture position, when the coin rolls in the coin pathway 5 at the lowest anticipated velocity, with the emission time of the illumination 22 added. That is, the accumulation time for each pixel is set such that the image of a coin which takes the maximum amount of time, from detection by the coin detection sensor 20, to arrive at the image-capture position, can be reliably stored.

Figure 5:
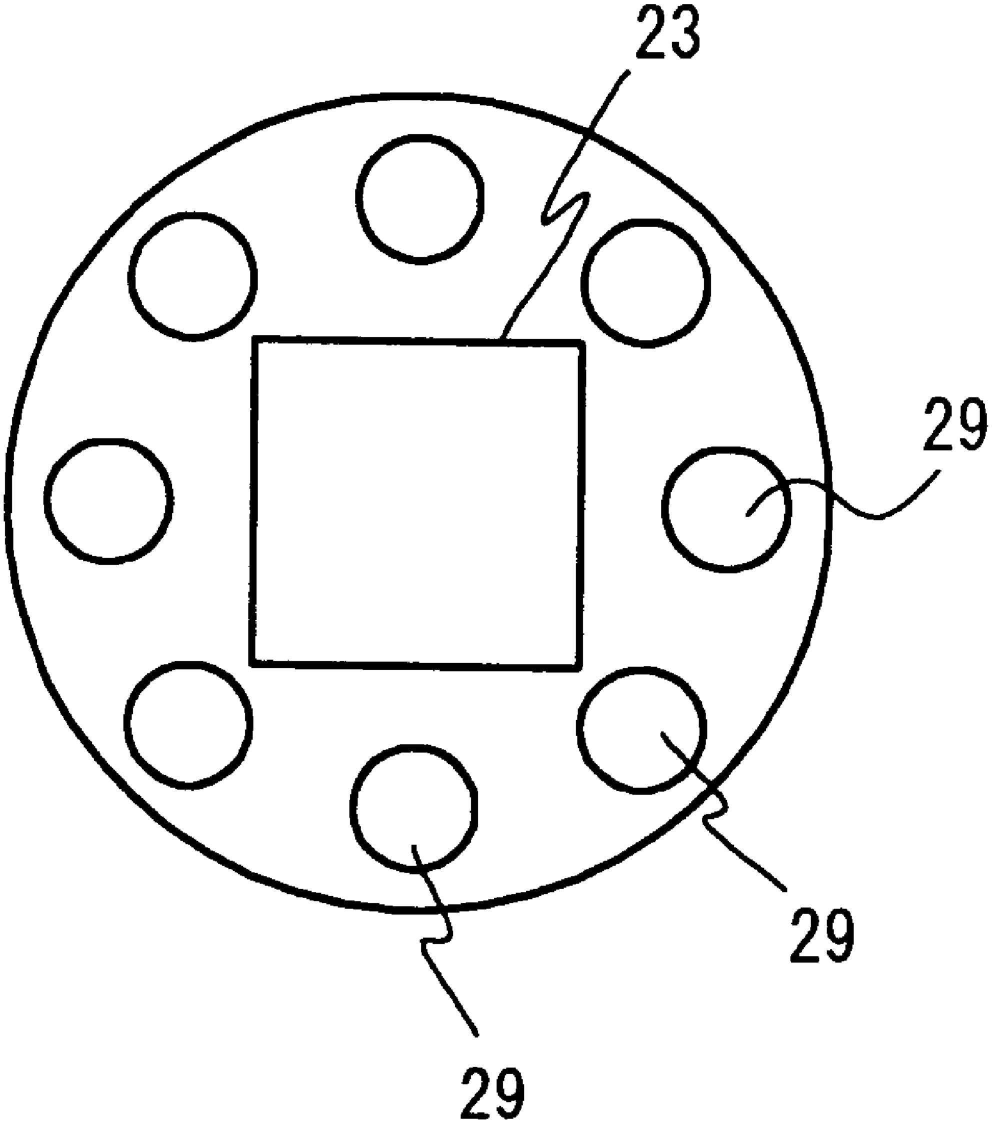
FIG. 5 is a figure showing one example of the installation position of the illumination 22.

The illumination 22 is positioned such that a coin for image capture arriving at the image-capture position is illuminated with light uniformly from all directions, so that shadows do not occur on the surface of the coin for image capture at the time of image capture. For example, as shown in FIG. 5, a plurality of emission elements 29 may be installed in a ring shape, surrounding the image sensor 23, as seen from the image-capture surface, and the illumination 22 and image sensor 23 integrated as an image-capture device.

The illumination 22 emits light in response to a detection signal from the coin detection sensor 21, and is extinguished in a sufficiently short length of time.

Figure 6:
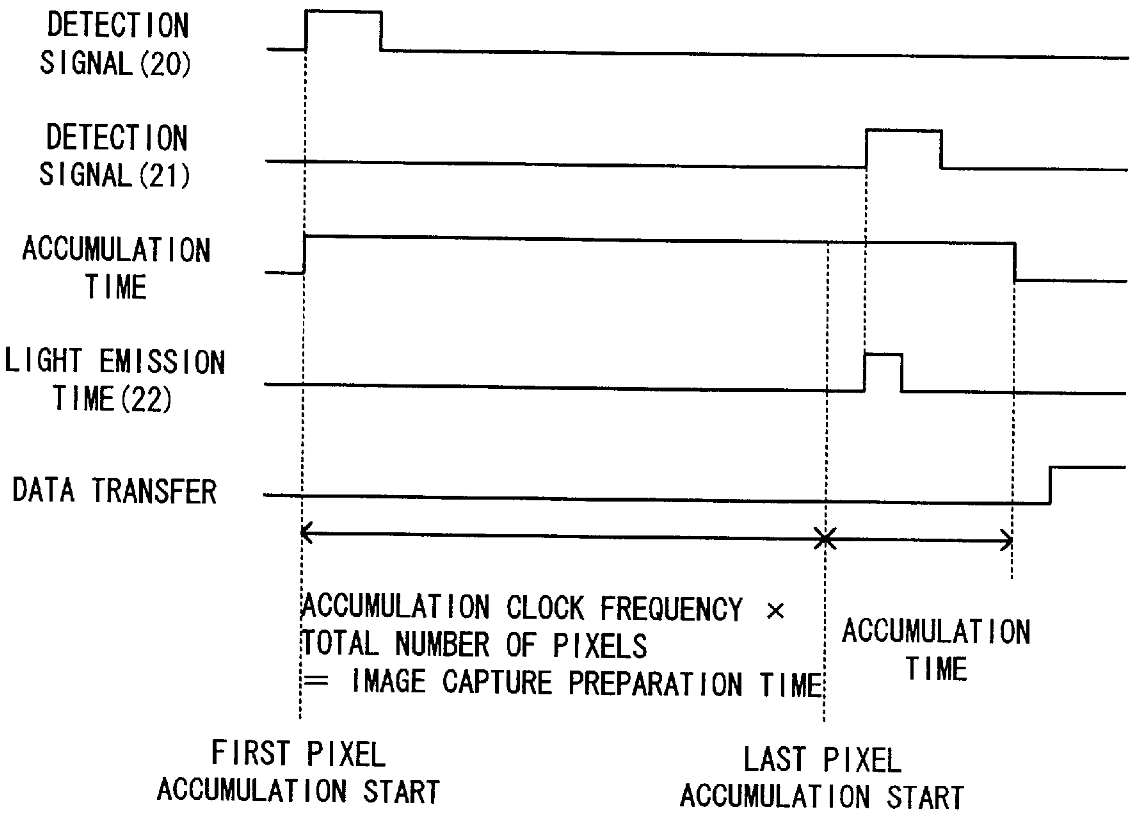
FIG. 6 is a figure showing the operation timing of each constituent component of the image input unit 2.

Next, the operation timing for each constituent component of the image input unit 2 is explained. FIG. 6 is a figure showing the operation timing of each constituent component of the image input unit 2.

When the coin detection sensor 20 detects a coin passing through the coin pathway 5, image-capture preparations for the first pixel of the image sensor 23 are begun, in sync with this detection signal.

When the coin detection sensor 21 detects a coin which has arrived at the image-capture position, the illumination 22 emits light for a short length of time, in sync with this detection signal, and in this state, the image of the coin for image capture is stored in the pixels of the image sensor 23.

By sequentially reading, one horizontal line of the pixel array 24 at a time, this image of the coin for capture stored in the pixels of the image sensor 23, two-dimensional image data of the coin surface can be obtained.

Until now, the case of image capture of the surface of the coin has been explained; but by changing the positions of the image sensor 23 and illumination 22, an image of the edge of the coin can also be captured.

By means of the configuration described above, image-capture preparations for the image sensor 23 are always completed before arrival of the coin at the image-capture position, regardless of the coin type or of the inclination angle of the coin pathway 5; hence a two-dimensional image of the coin surface can be obtained reliably, without omissions of image data.

By maintaining the coin pathway 5 in a darkened state with interfering light blocked, and by illuminating with light for a short time when the coin arrives at the image-capture position, an image of the coin surface can be obtained as a stationary image.

Figure 7:
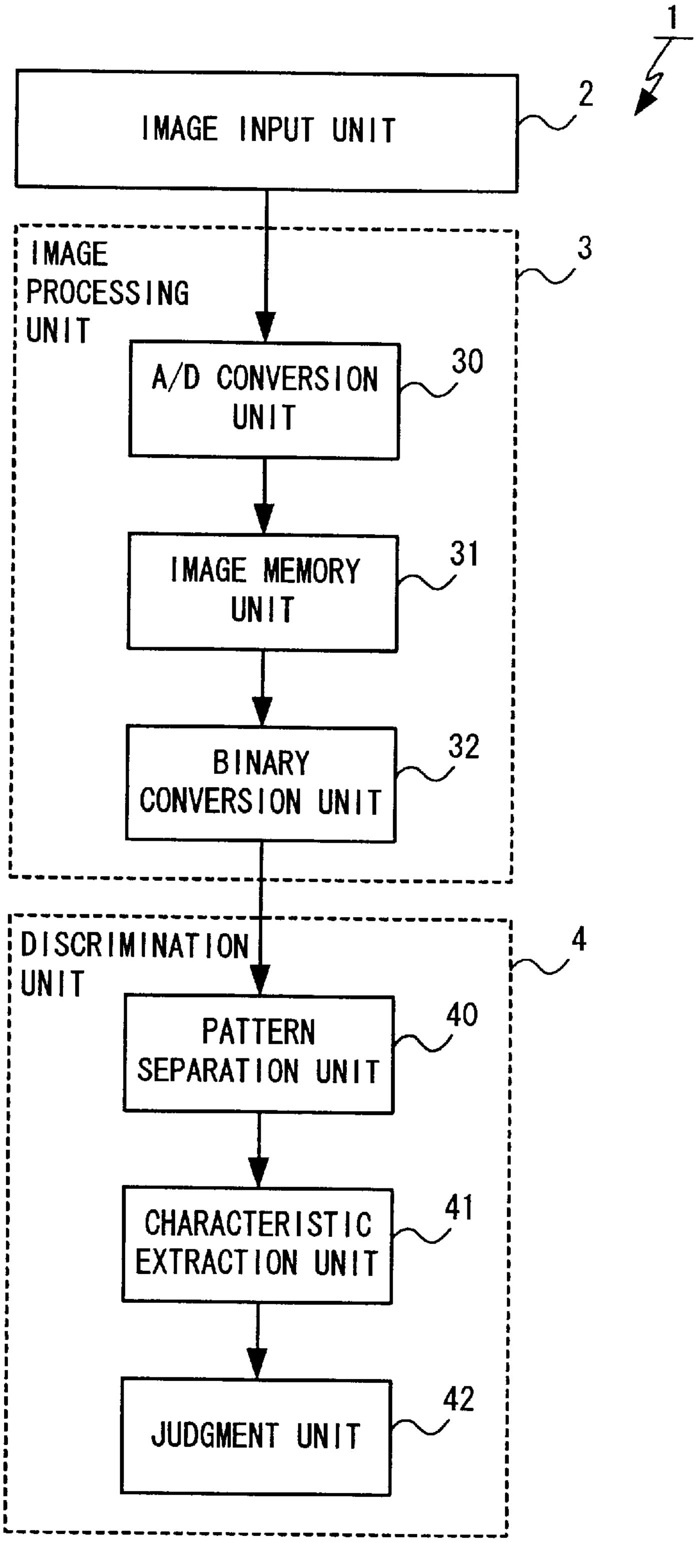
FIG. 7 is a block diagram showing the configuration of the image processing unit 3 and discrimination unit 4.

Next, details of the image processing unit 3 and discrimination unit 4 are explained. FIG. 7 is a block diagram showing the configuration of the image processing unit 3 and discrimination unit 4.

As shown in this figure, the image processing unit 3 comprises an A/D conversion unit 30, image memory unit 31, and binary conversion unit 32; the discrimination unit 4 comprises a pattern division unit 40, characteristic extraction unit 41, and judgment unit 42.

The A/D conversion unit 30 converts the analog image signals output by the image input unit 2 into digital multi-level image signals. The image memory unit 31 temporarily stores the digitally converted image signals and transfers these signals to the binary conversion unit 32; the binary conversion unit 32 converts the multilevel image signals into binary-level image signals. In the binary conversion unit 32, processing is performed as necessary to enhance outlines, in order to prevent the separation of patterns which should be a single group.

By performing the processing described below, the pattern separation unit 40 separates patterns which are connected but should be separated. The characteristic extraction unit 41 performs labeling processing and extracts patterns, determines the area, center of gravity and other characteristic quantities for each pattern, and stores the characteristic quantities thus determined. The judgment unit 42 compares the characteristic quantities extracted by the characteristic extraction unit 41 with reference values, and discriminates between genuine and counterfeit coins and between coin types.

Here, pattern connection due to binary level conversion of images is explained.

Figure 8:
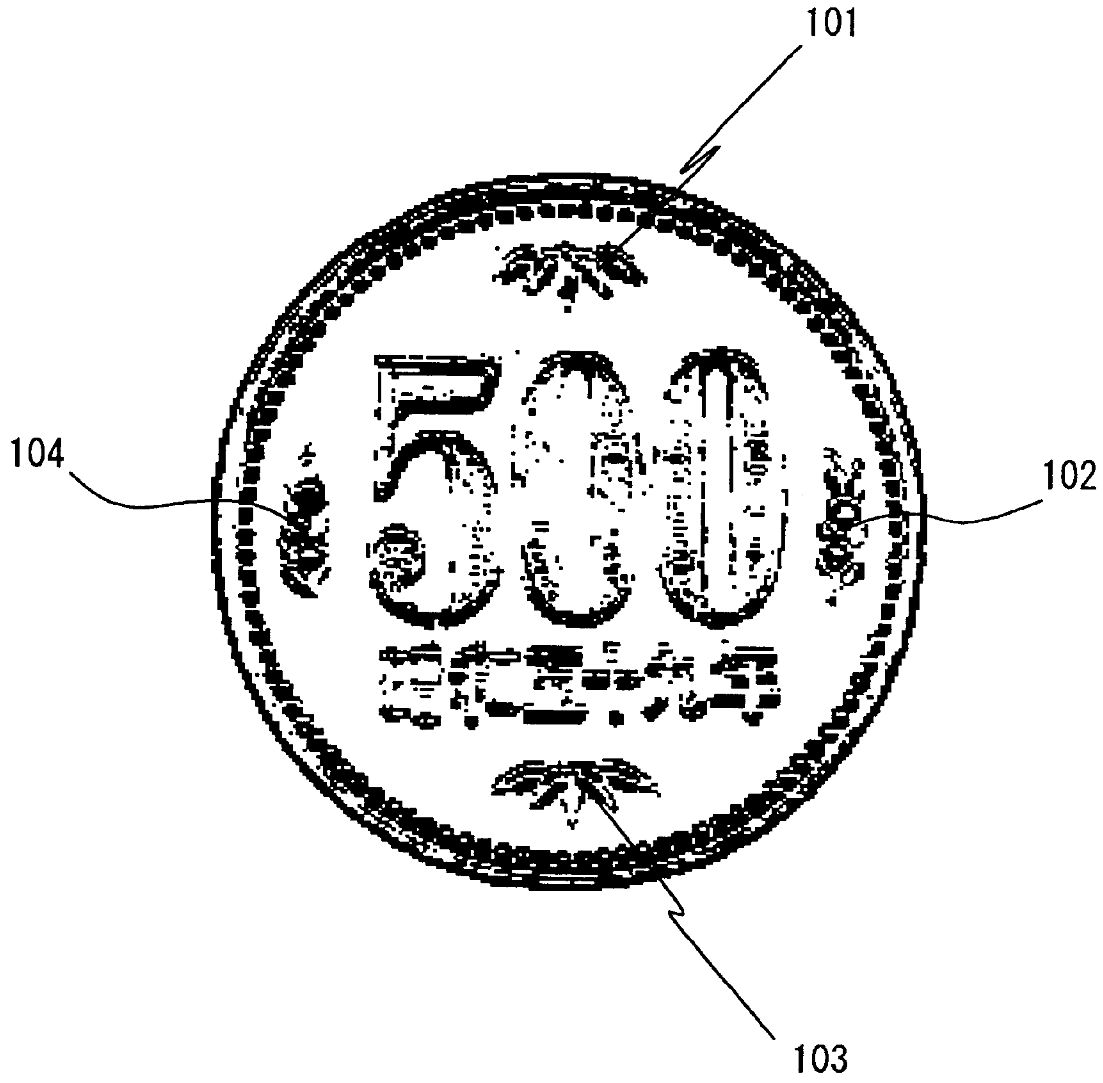
FIG. 8 is a figure showing the bottom side of a 500 yen coin.
Figure 9:
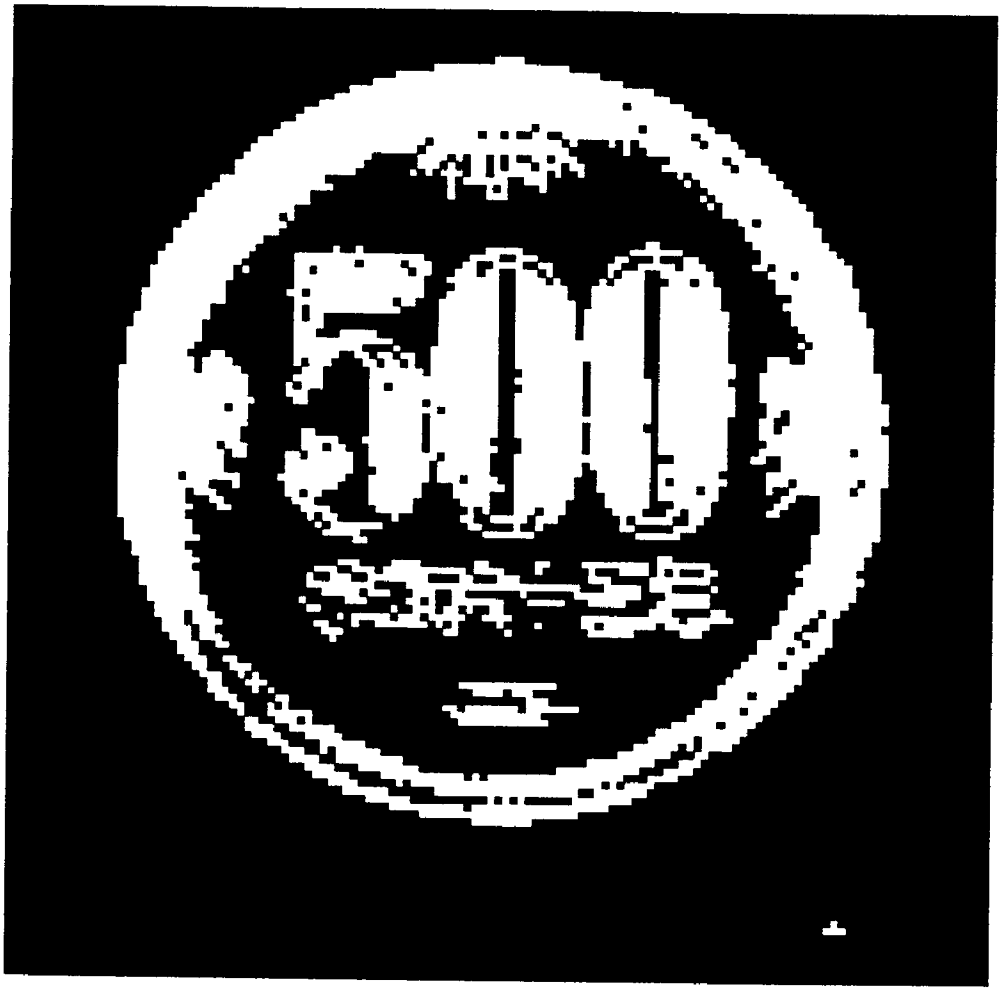
FIG. 9 is a figure showing an example of an image converted to binary level with a comparatively low threshold.

When for example using the leaf-shape patterns 101, 102, 103, 104 on the bottom side of the 500 yen coin shown in FIG. 8 to perform discrimination, when the image is converted to binary level using a certain threshold, the leaf-shape patterns 101, 102, 103 are connected with the pattern of the coin perimeter, as shown in FIG. 9. In order to avoid this, on performing binary level conversion of the image using a higher threshold, the leaf-shape pattern 104 and surrounding pattern are lost, as shown in FIG. 10.

Figure 10:
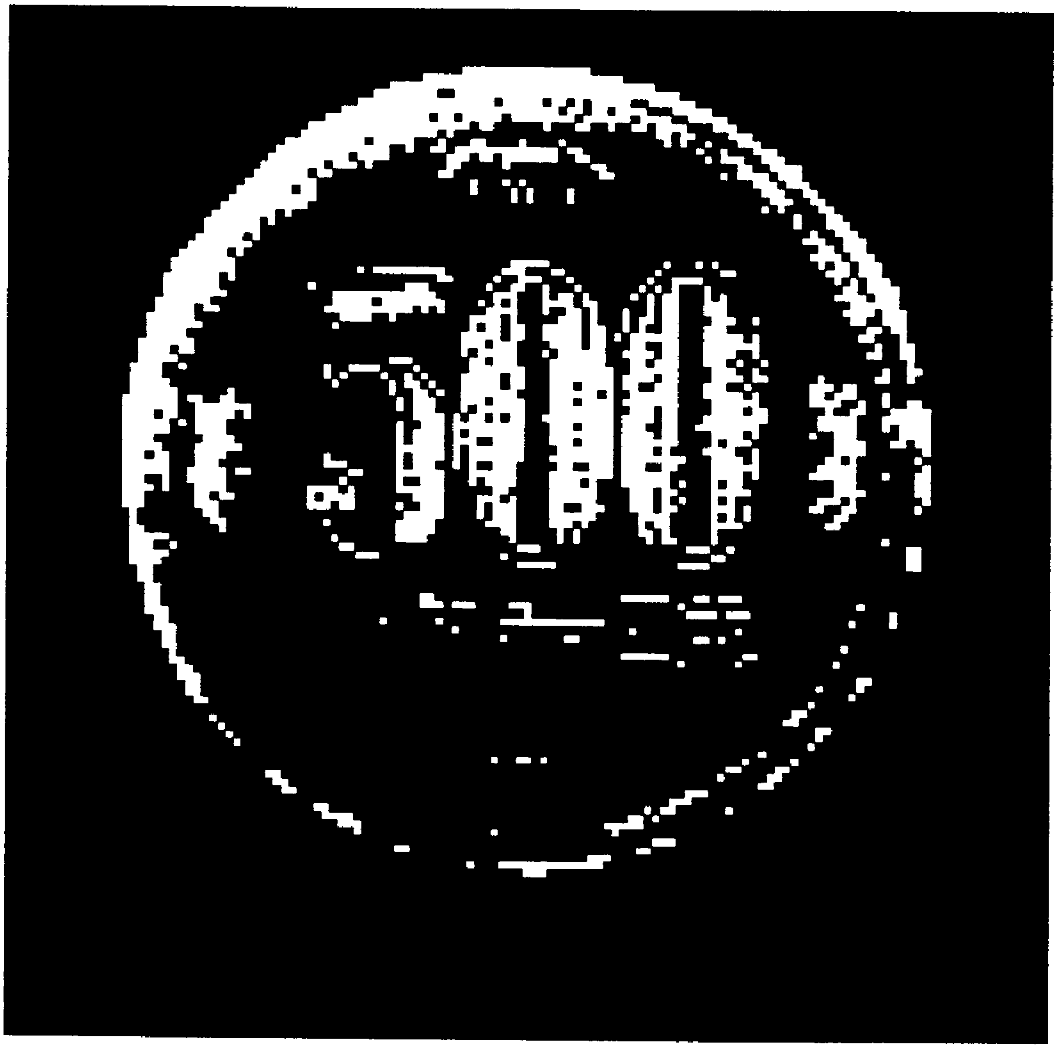
FIG. 10 is a figure showing an example of an image converted to binary level with a comparatively high threshold.

When a pattern is completely lost as in FIG. 10, it is conceivable that discrimination may become impossible; but when patterns are connected as in FIG. 9, by separating these patterns, discrimination becomes possible. For this reason, the pattern separation unit 40 performs processing to separate connected patterns.

Here the pattern separation processing in the pattern separation unit 40 is explained.

Figure 11:
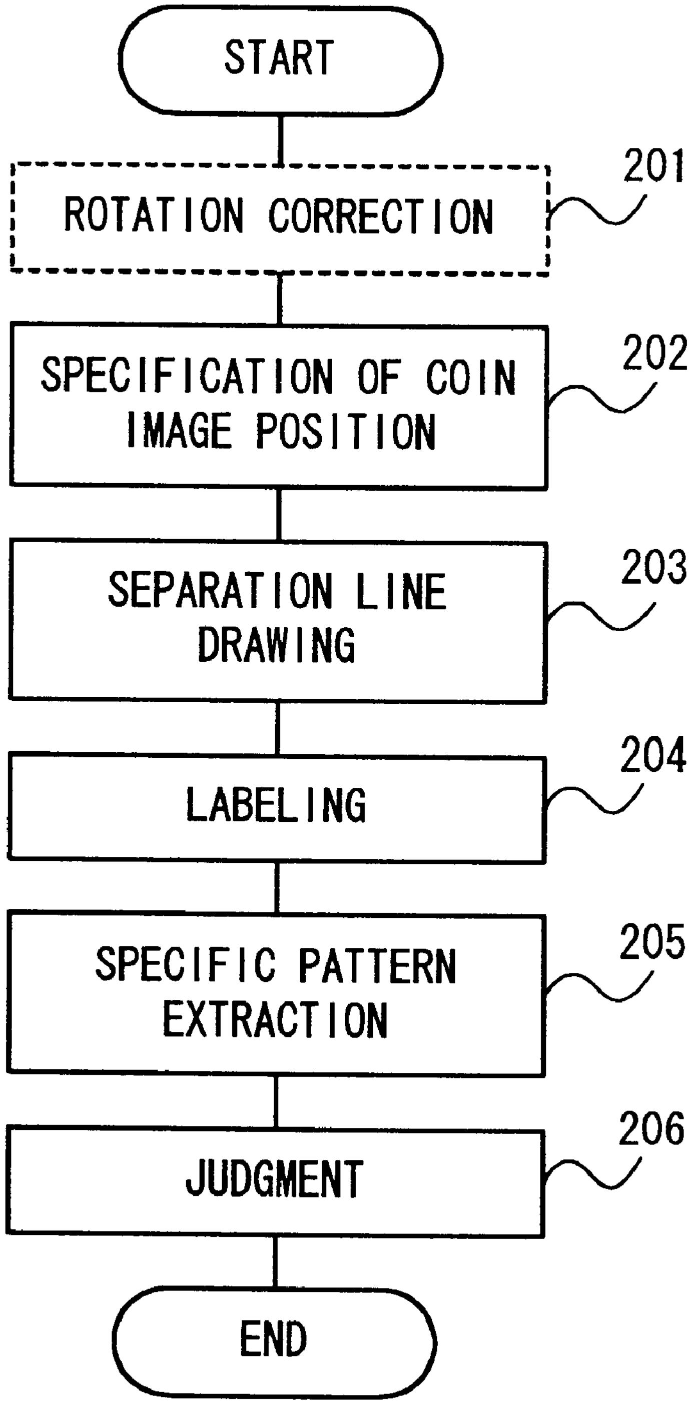
FIG. 11 is a flow chart showing the flow of pattern separation processing and discrimination processing.

FIG. 11 is a flow chart showing the flow of pattern separation processing and discrimination processing.

The pattern separation unit 40 first specifies the position of the coin image in the binary image (step 202). Prior to specifying the position, there are cases in which rotation correction of the binary image is performed; here however it is assumed that no rotation correction is performed (an explanation of cases in which rotation correction is performed is given below).

Figure 12:
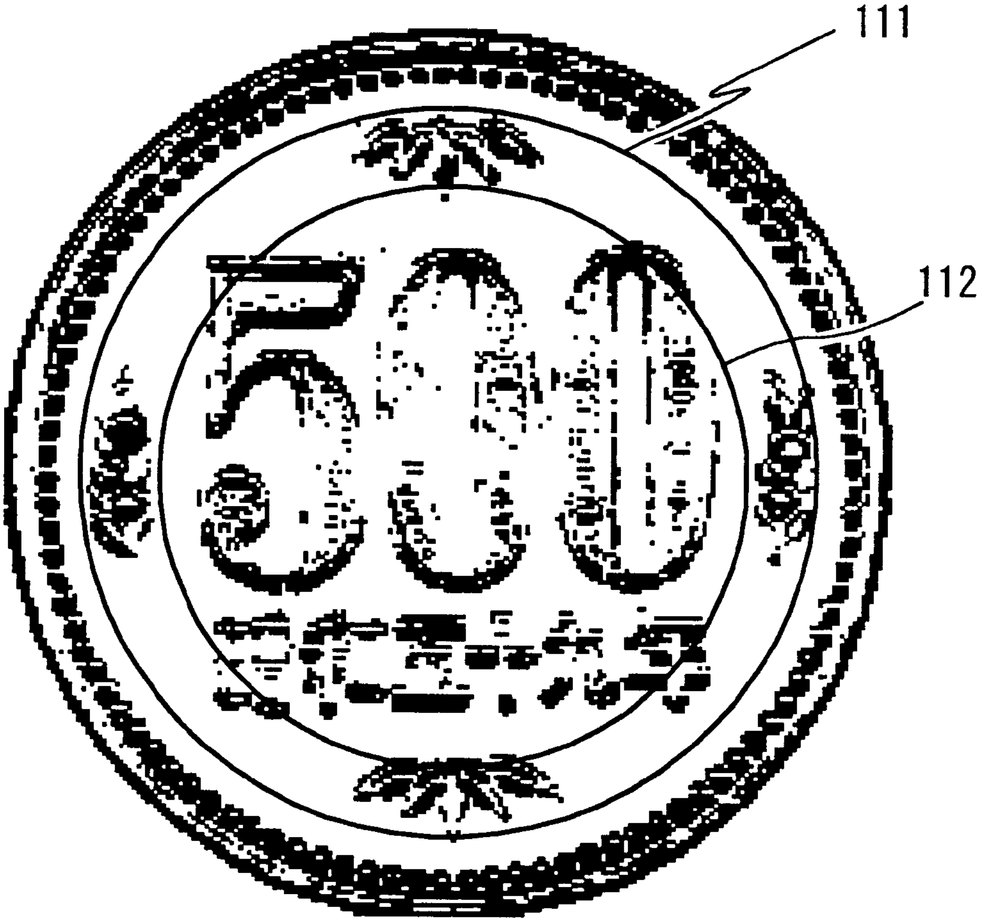
FIG. 12 is a figure showing an example of the drawing of separation lines.
Figure 13:
FIG. 13 is a figure showing the results of drawing of separation lines.

Next, the pattern separation unit 40 draws the separation line 111 and separation line 112, as shown in FIG. 12 (step 203). The separation lines 111 and 112 are each circles which are concentric with the coin image, and of width one pixel. The separation lines 111 and 112 are drawn in the background color (the color opposite the pattern color). For example, in the case of the separation lines 111 and 112 drawn on the binary image shown in FIG. 9, the lines are drawn in black (because the pattern is white), as in FIG. 13; as a result, the leaf-shape patterns can be separated from the perimeter. In the case shown in FIG. 13, the separation line 112 is not necessary; but depending on the binary image, a leaf-shape pattern and the character pattern "500" may be connected, and in such cases, drawing of the separation line 112 is useful.

When the pattern separation unit 40 draws the separation lines 111 and 112, the characteristic extraction unit 41 performs labeling processing and extracts patterns (step 204), and from these patterns, leaf-shape patterns which are specific patterns are extracted (step 205). Then, the judgment unit 42 compares the positional relation of the leaf-shape patterns with reference values and performs other processing, and judges whether or not the coin image is of the bottom side of a 500 yen coin (step 206).

Figure 14:
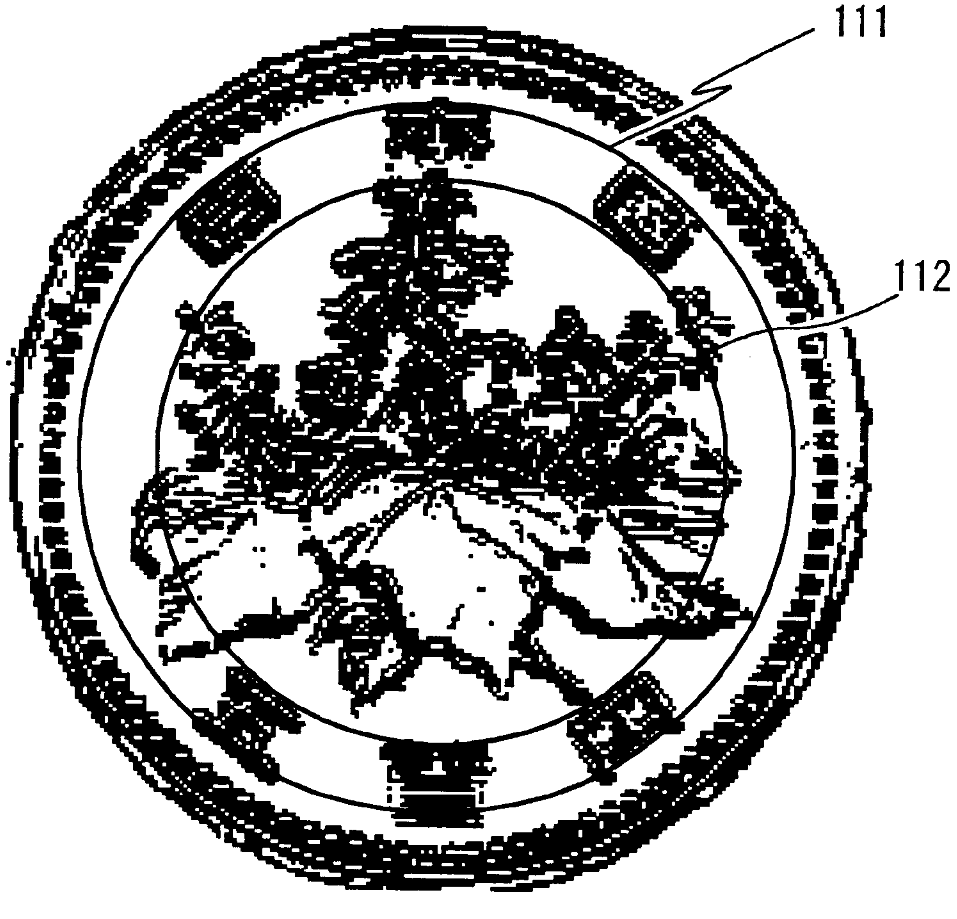
FIG. 14 is a figure showing an example of the drawing of separation lines on the surface image of a 500 yen coin.

When, as shown in FIG. 14, the separation lines 111, 112 are drawn on an image of the top side of a 500 yen coin, the character patterns for each of the characters inscribed in the coin can be separated, so that when using these character patterns as specific patterns for the top side of a 500 yen coin, the same separation lines 111, 112 can be used for both the top side and the bottom side to perform pattern separation processing.

Here, discrimination is explained for the case in which a leaf-shape pattern and character pattern are used as specific patterns.

Figure 15:
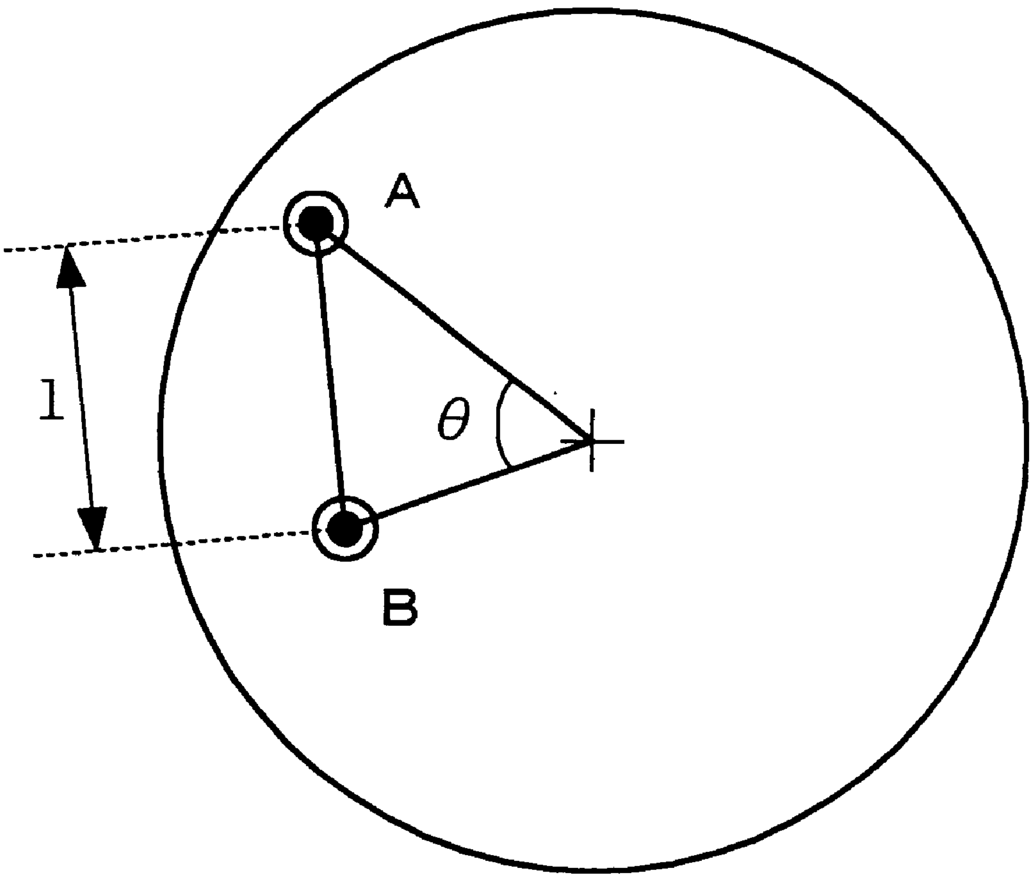
FIG. 15 is a figure (1) used to explain discrimination for the case in which a leaf-shape pattern and a character pattern are taken as specific patterns.
Figure 16:
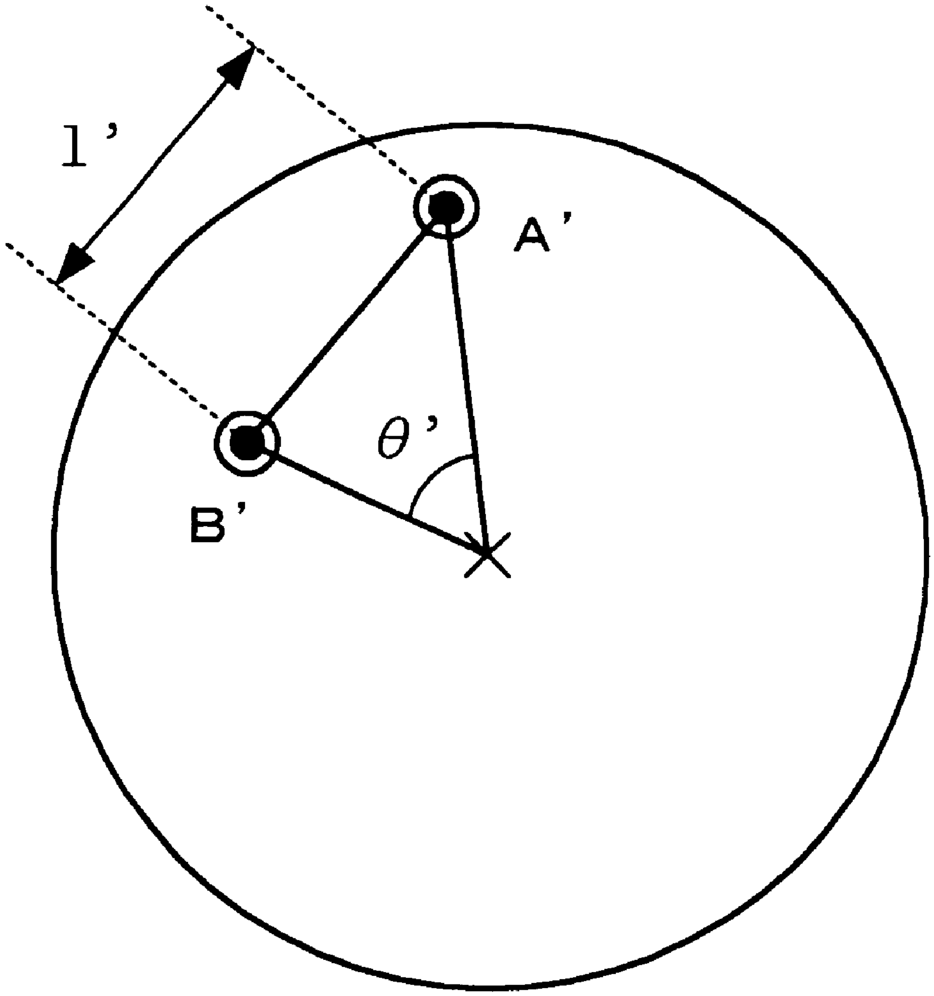
FIG. 16 is a figure (2) used to explain discrimination for the case in which a leaf-shape pattern and a character pattern are taken as specific patterns.

First, in a circular image of a coin or other object, if the distance between point A and point B shown in FIG. 15 is 1, and the angle formed by the line segments connecting these points to the center of the circle is θ, then when the entire image is rotated as shown in FIG. 16, the distance 1' between point A' and point B' is 1'=1, and the angle θ' formed by the line segments connecting point A' and point B' to the circle center is θ'=θ. Hence when a leaf-shape pattern and character pattern are used as specific patterns, rotation of the coin image due to rolling of the coin does not affect discrimination, and so the processing of step 201 in FIG. 11 can be omitted.

Figure 17:
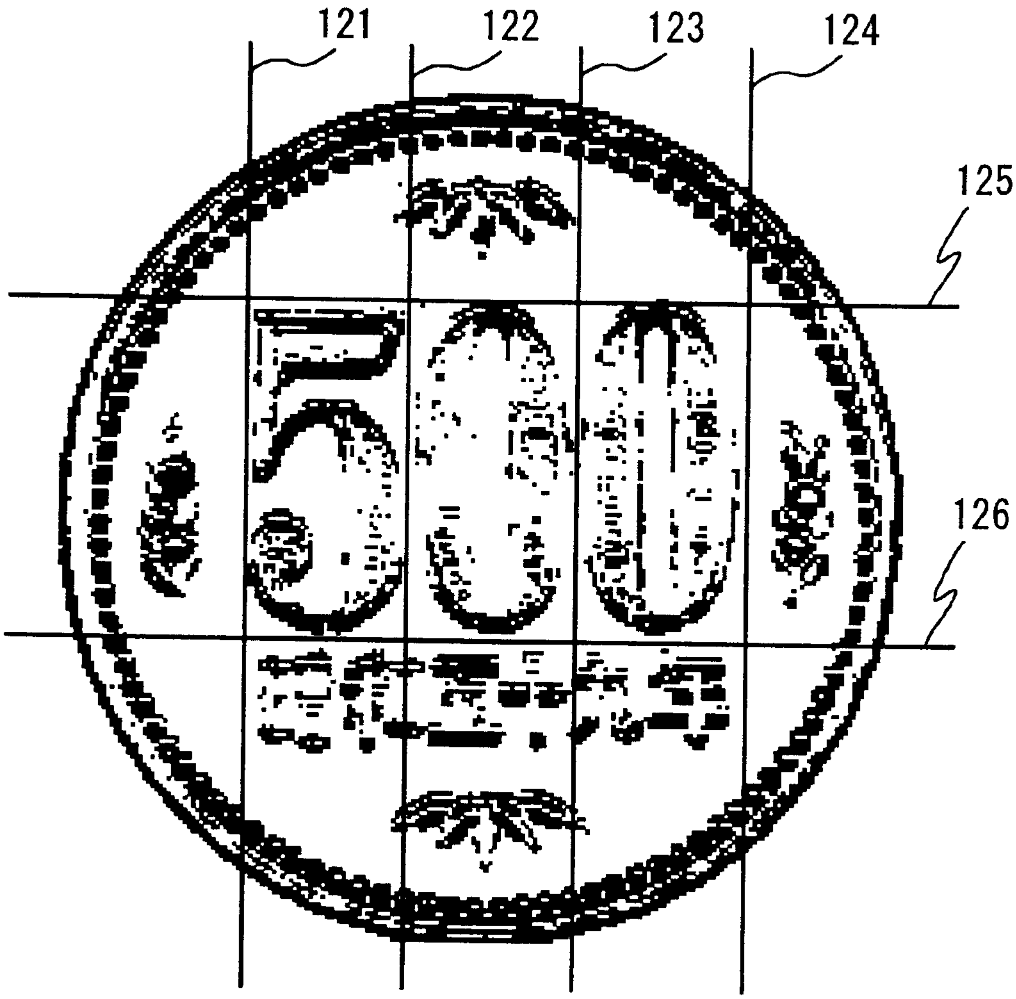
FIG. 17 is a figure showing an example of the drawing of straight-line separation lines.

When the rotation correction processing of step 201 is performed and the coin image is positioned upright, by drawing the separation lines 121 through 126 as shown in FIG. 17, the character patterns "5", "0" and "0" can be separated.

Hence when rotation correction is performed for the coin image, the separation lines can be straight lines, and the separation lines can be associated with various specific patterns.

In the above explanation, the example of a 500 yen coin is used; but this invention can be applied to any kind of coin, and specific patterns can be freely established.

Figure 18:
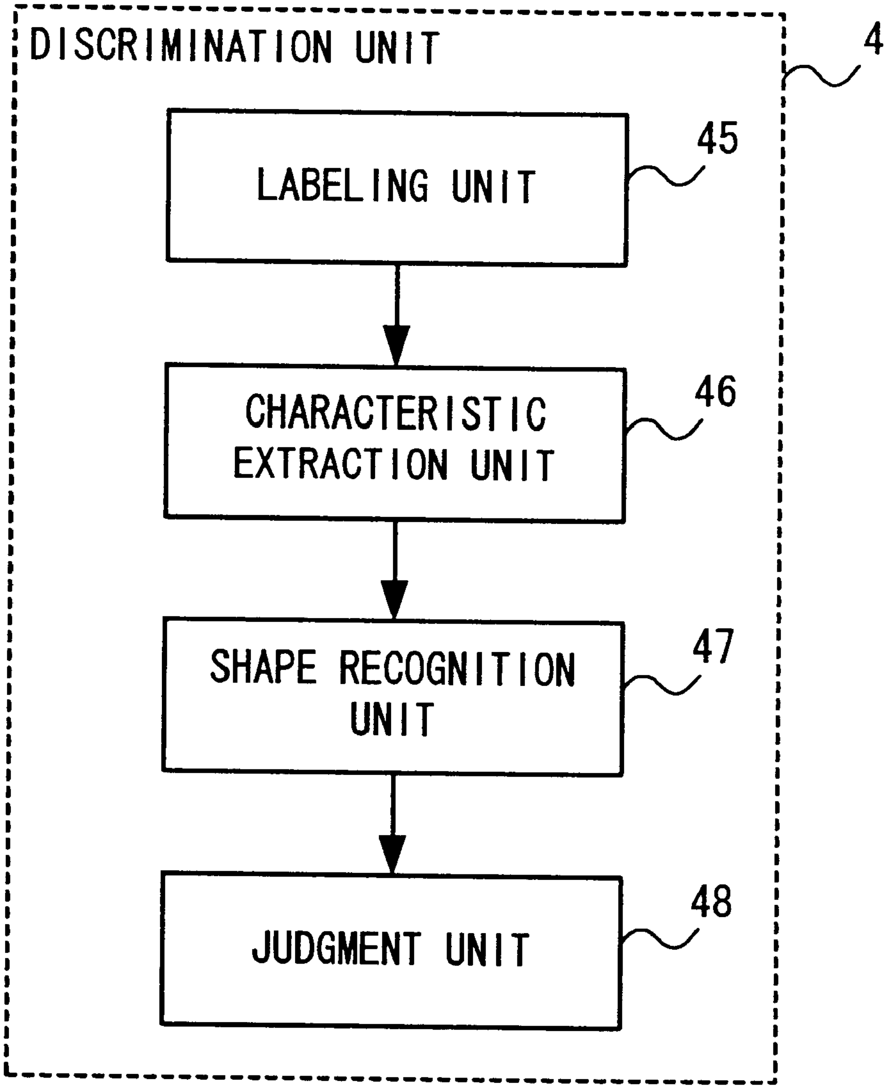
FIG. 18 is a block diagram showing a configuration of the discrimination unit 4, separate from that of FIG. 7.

Next, an example of another configuration of the discrimination unit 4 is explained. FIG. 18 is a block diagram showing a configuration of the discrimination unit 4, separate from that of FIG. 7.

As shown in the figure, the discrimination unit 4 comprises a labeling unit 45 and characteristic extraction unit 46, shape recognition unit 47, and judgment unit 48.

The labeling unit 45 performs labeling processing for image signals output by the binary conversion unit 32; for example, when protrusions in the coin surface are represented by white pixels, an area in which white pixels are connected is regarded as one area, and is distinguished from other separated white pixel areas. The characteristic extraction unit 46 determines the area, center of gravity, and other characteristic quantities for each area subjected to labeling processing by the labeling unit 45, and stores the characteristic quantities thus determined. The shape recognition unit 47 determines the distances and angles between pluralities of centers of gravity and the ratios of areas of pluralities of areas, based on the characteristic quantities extracted by the characteristic extraction unit 46. The judgment unit 48 compares each of the values recognized by the shape recognition unit 47 with reference values, and discriminates between genuine and counterfeit coins and between coin types.

Next, processing by the labeling unit 45, characteristic extraction unit 46, shape recognition unit 47, and judgment unit 48 is explained. First, an overview is given.

Figure 19:
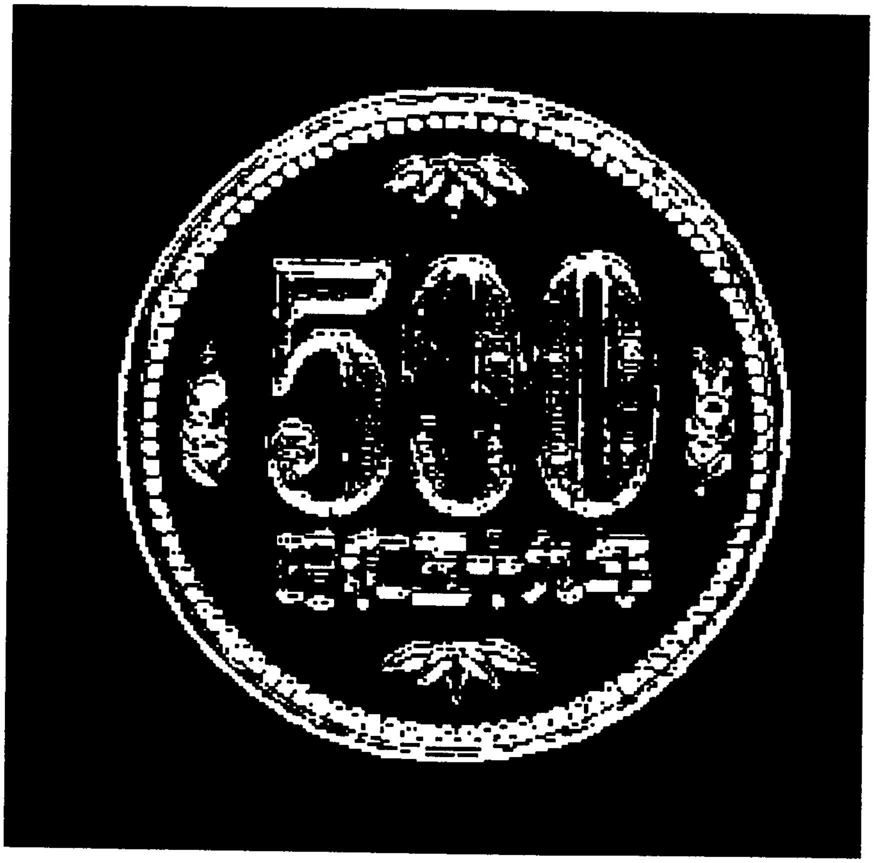
FIG. 19 is a figure showing a binary image of the bottom side of a 500 yen coin.

Using a 500 yen coin as an example in the explanation, a binary image of the bottom side of a 500 yen coin is as shown in FIG. 19.

Figure 20:
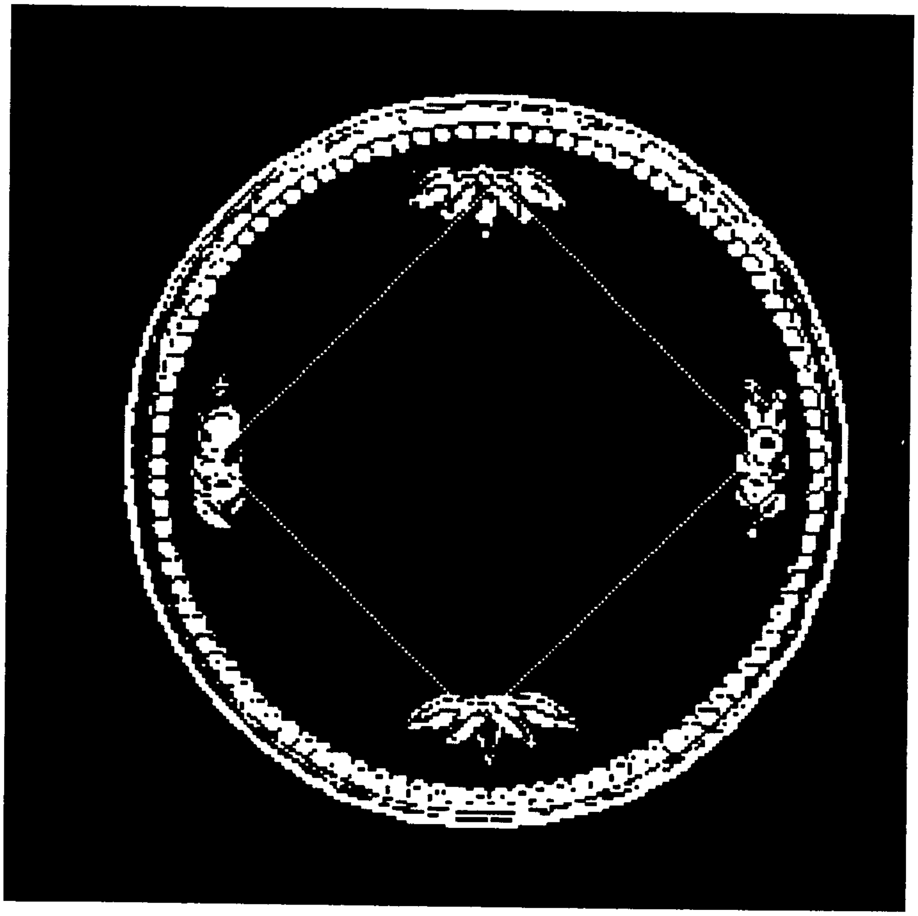
FIG. 20 is a figure showing a quadrilateral shape formed by connecting patterns on the bottom side of a 500 yen coin.

On the bottom side of a 500 yen coin, leaf-shape patterns (areas) are positioned in four places near the outer perimeter; the quadrilateral formed by connecting the centers of gravity of these patterns is a square, as shown in FIG. 20. The centers of gravity (Xc,Yc) of each of the patterns can be represented by eq. 1, taking for example the number of pixels comprised by the pattern to be n, and the coordinates of each pixel to be (Xi,Yi) (i=0, . . . , n−1).

$$(Xc, Yc) = \left( \sum_{i=0}^{n-1} Xi/n, \sum_{i=0}^{n-1} Yi/n \right) \quad \text{(Eq. 1)}$$

Figure 21:
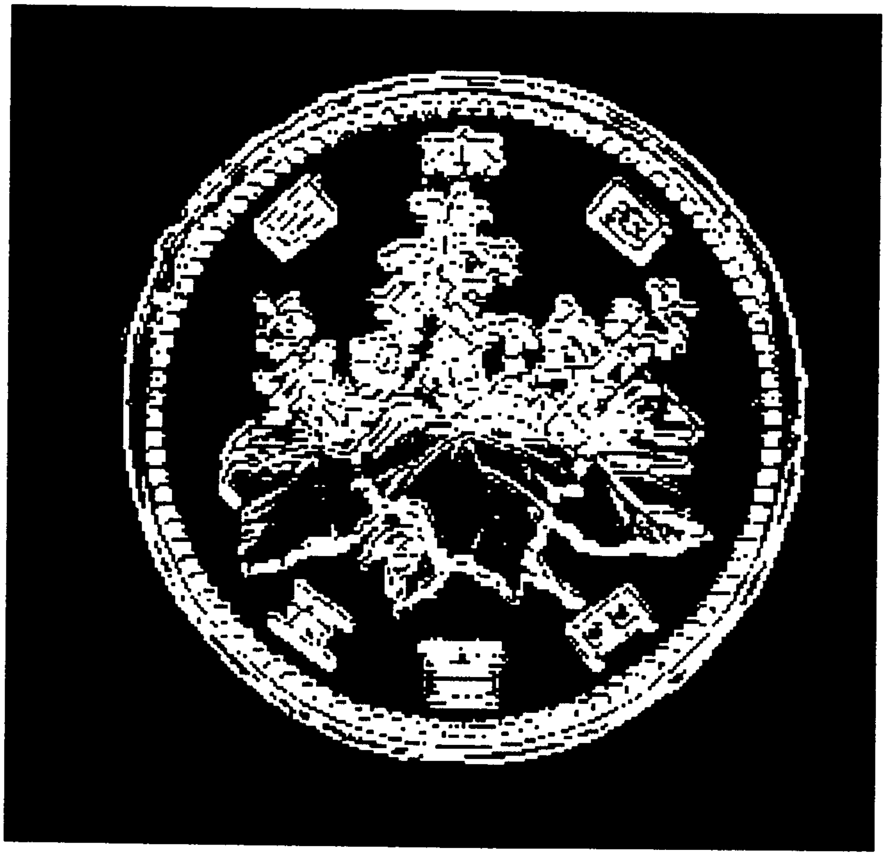
FIG. 21 is a figure showing a binary image of the top side of a 500 yen coin.
Figure 22:
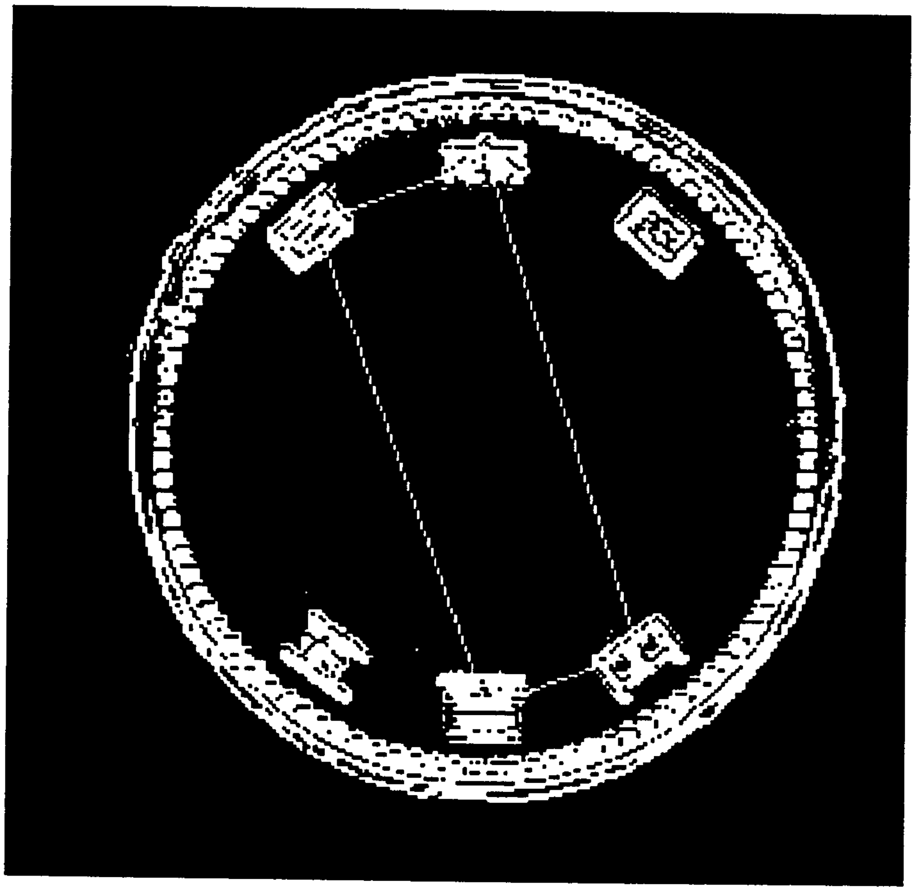
FIG. 22 is a figure showing a quadrilateral shape formed by connecting patterns on the top side of a 500 yen coin.

The binary image of the top side of a 500 yen coin is as shown in FIG. 21, with character patterns located in six places near the outer perimeter. These character patterns are positioned at places located a distance from the coin center which is approximately equal to that of the leaf-shape patterns on the bottom side; however, the quadrilateral formed by connecting any four of the centers of gravity of the character patterns is not a square, as indicated in FIG. 22.

In this way, the shape of the quadrilaterals formed on the top side and on the bottom side of a 500 yen coin are different; this is used as a characteristic to perform discrimination. This characteristic is, in actuality, specified by the distances between, and the angles from the coin center of, the centers of gravity of the patterns; but this is not affected by the rotation angle of the image or by the enlargement or reduction factor.

For example, if the coordinates of point A are (X1,Y1) and the coordinates of point B are (X2,Y2) in FIG. 15, then the distance 1 between A and B is expressed by eq. 2.

$$l = \sqrt{(X1 - X2)^2 + (Y1 - Y2)^2} \quad \text{(Eq. 2)}$$

If the coordinates of the center of the coin (circle) are (X0,Y0), then the angle θ1 made with the X-axis by the line segment connecting point A with the center is expressed by eq. 3, and the angle θ2 made with the X-axis by the line segment connecting point B with the center is expressed by eq. 4. Hence eq. 5 can be used to compute the angle θ made by the line segment connecting point A with the center and the line segment connecting point B with the center.

$$\theta 1 = \tan^{-1}\left(\frac{Y1 - Y0}{X1 - X0}\right) \quad \text{(Eq. 3)}$$

$$\theta 2 = \tan^{-1}\left(\frac{Y2 - Y0}{X2 - X0}\right) \quad \text{(Eq. 4)}$$

$$\theta = |\theta 1 - \theta 2| \quad \text{(Eq. 5)}$$

Point A' and point B' in the image shown in FIG. 16, obtained by rotating the image of FIG. 15 through an arbitrary angle, correspond to point A and point B respectively. In this case, the distance 1' between the points A' and B' computed from eq. 2 is such that 1=1', and the angle θ' made by the line segment connecting point A' and the center with the line segment connecting point B' and the center, computed from eq. 5, is such that θ=θ'.

Figure 23:
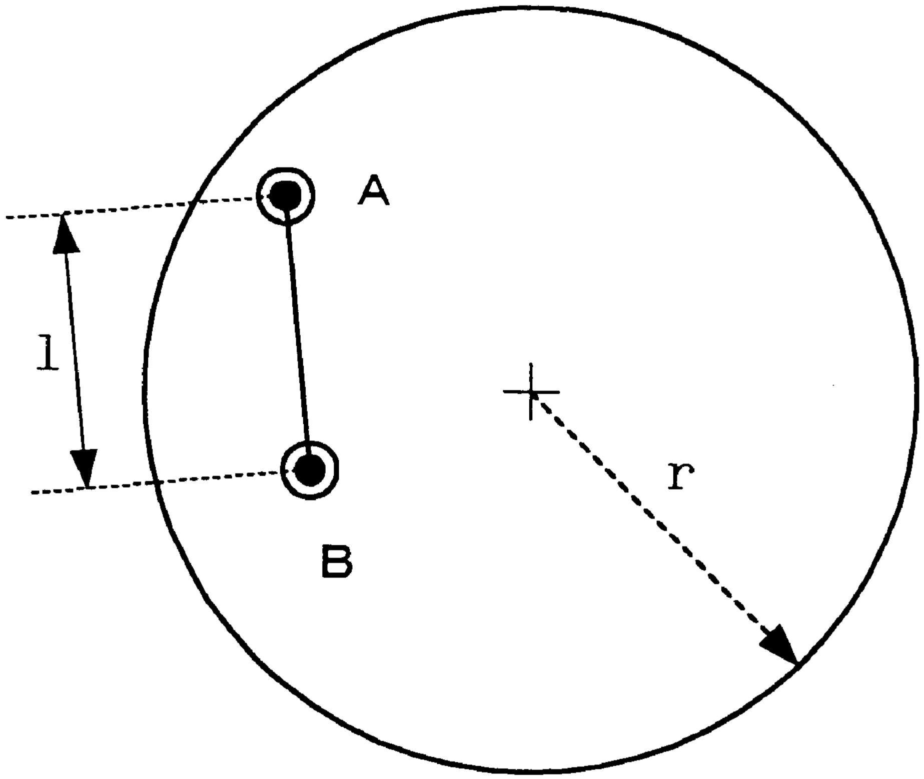
FIG. 23 is a figure (1) used to explain the relation between patterns in cases in which an image is enlarged or reduced.
Figure 24:
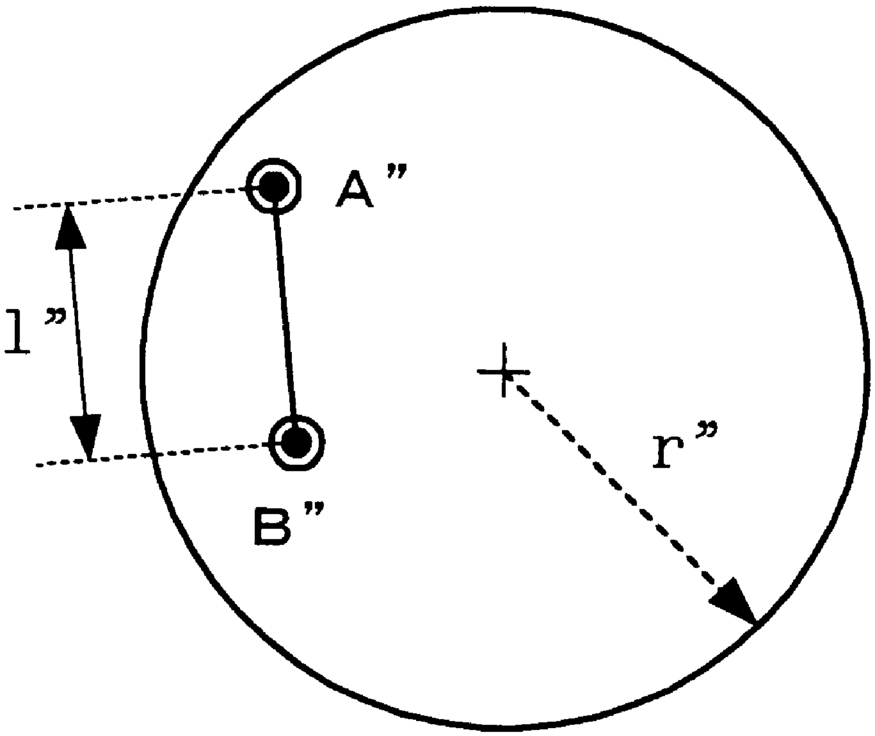
FIG. 24 is a figure (2) used to explain the relation between patterns in cases in which an image is enlarged or reduced.

If, as in the image shown in FIG. 23, the radius of the coin (circle) is r, and the radius of the coin (circle) in the image shown in FIG. 24 which is enlarged or reduced from the image of FIG. 23 is r", then from eq. 2, the relation between the distance 1 between A and B and the distance 1" between A" and B" is as indicated in eq. 6.

$$l'' = l \times \frac{r''}{r} \quad \text{(Eq. 6)}$$

Hence the distance between centers of gravity is constant regardless of the rotation angle of the image (coin), and even if the enlargement or reduction ratio is different, the ratio is constant. Because the angle made by the line segments connecting the two centers of gravity with the coin center is constant regardless of the image rotation angle and enlargement or reduction ratio, the above-described characteristic quantities are not affected by image rotation or similar.

Next, the details of processing by the labeling unit 45, characteristic extraction unit 46, shape recognition unit 47, and judgment unit 48 are explained, referring to FIG. 25 through FIG. 33.

Figure 25:
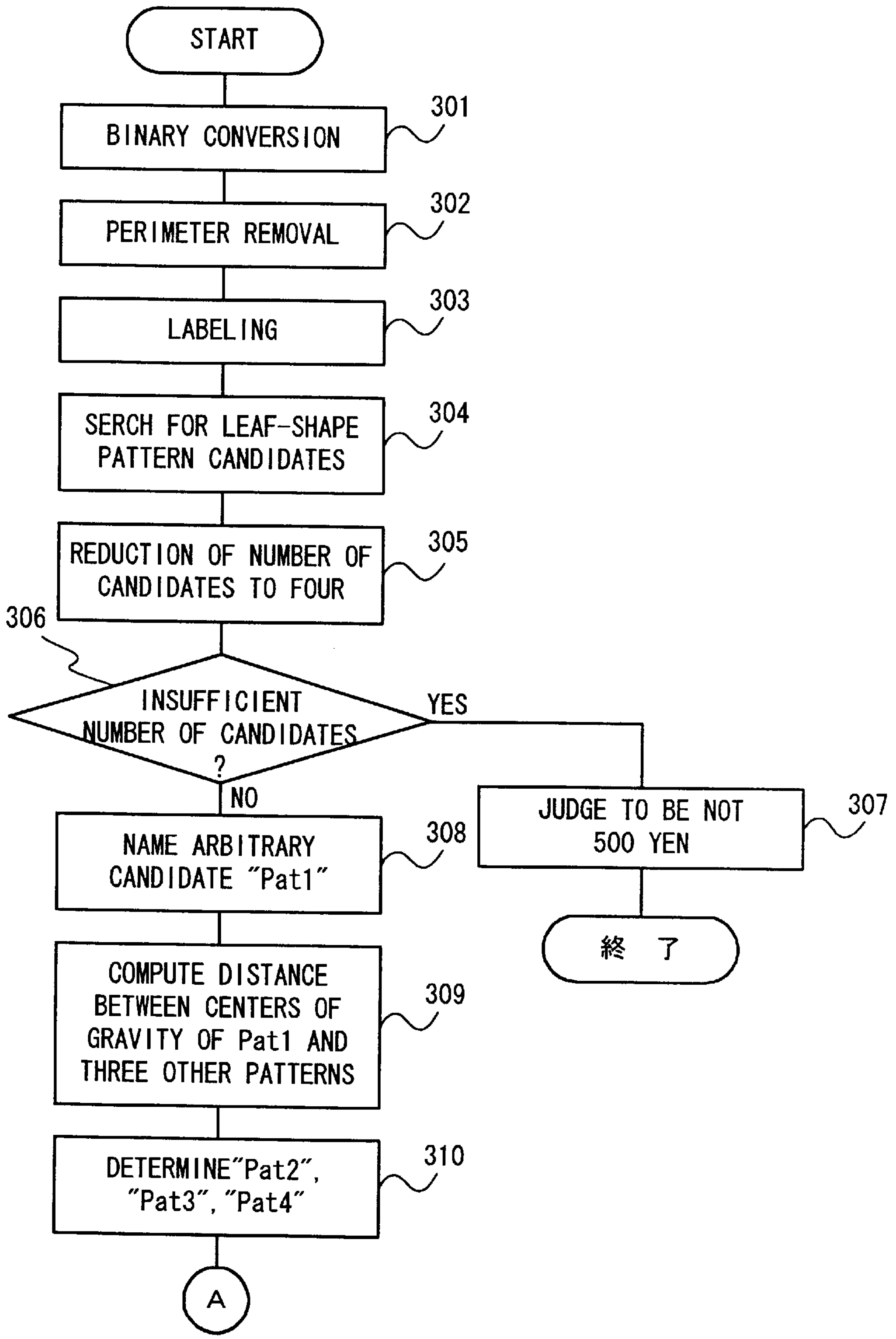
FIG. 25 is a flow chart (1) showing the flow of processing of each unit.
Figure 26:
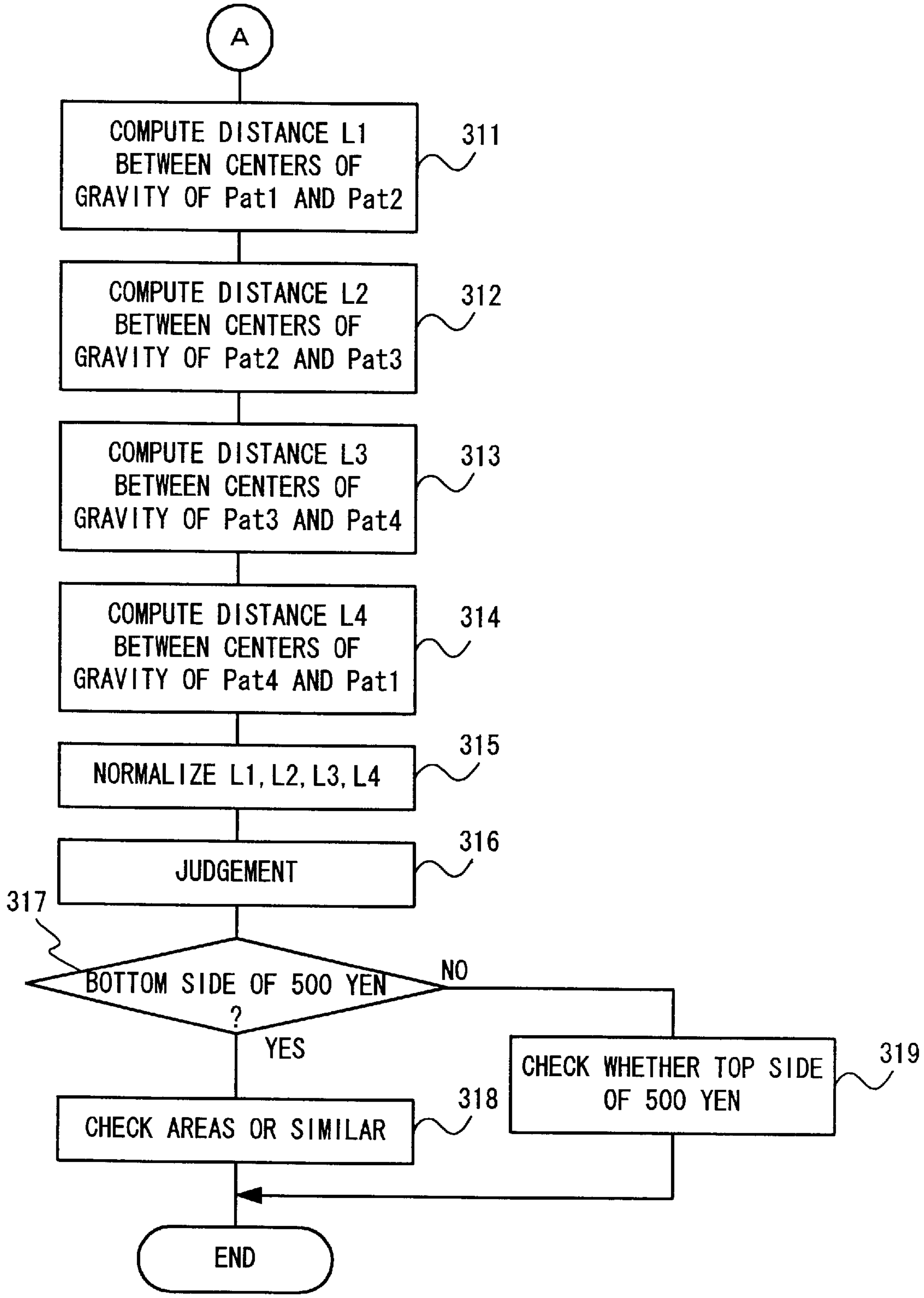
FIG. 26 is a flow chart (2) showing the flow of processing of each unit.

FIG. 25 and FIG. 26 are flow charts showing processing by individual units; FIG. 27 through FIG. 33 are examples of images used in explaining the processing of individual units.

Figure 27:
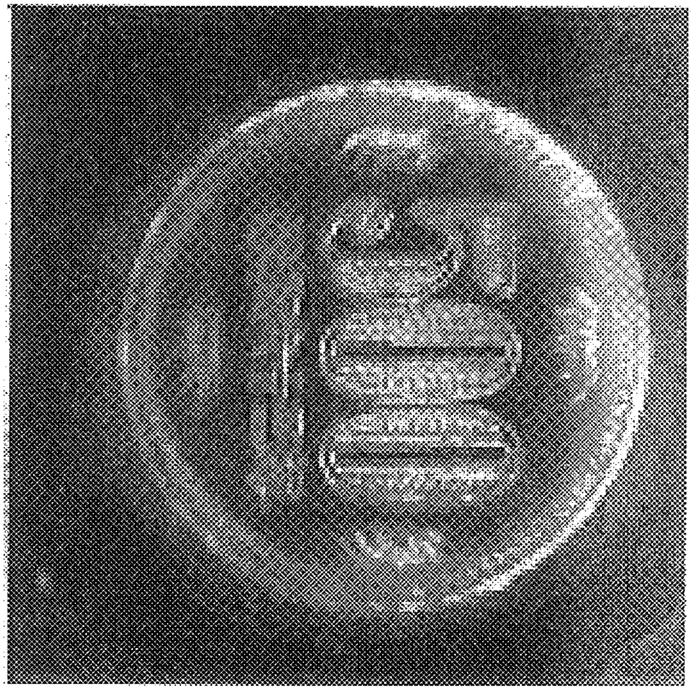
FIG. 27 is an image example (1) used to explain the processing of each part.
Figure 28:
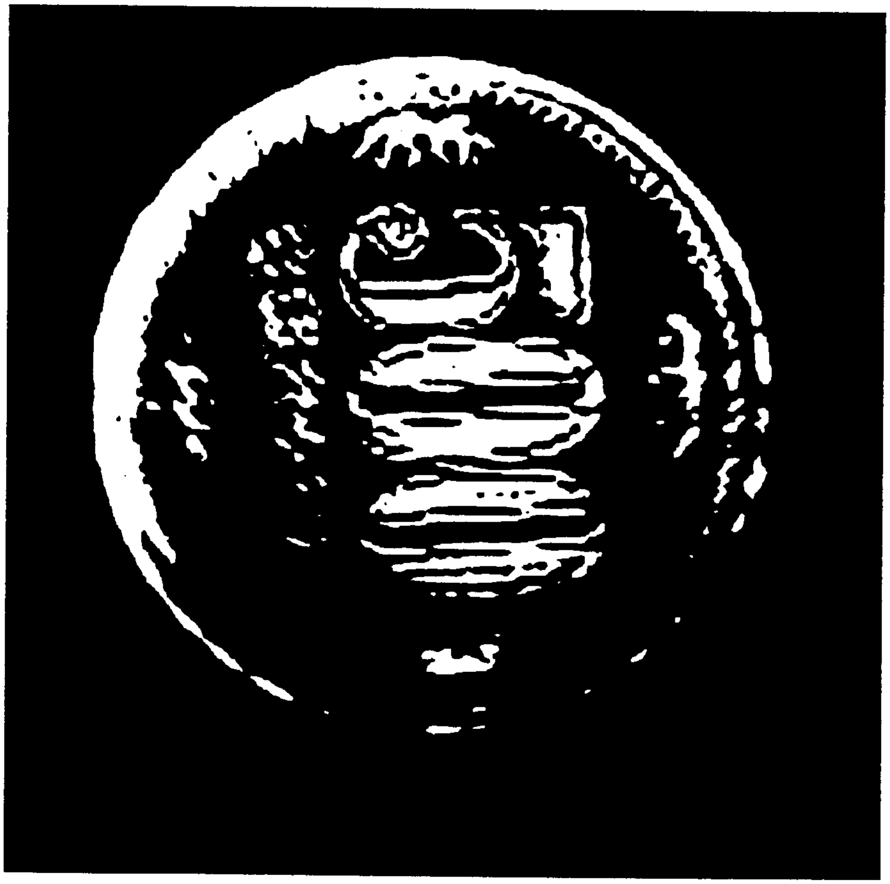
FIG. 28 is an image example (2) used to explain the processing of each part.
Figure 29:
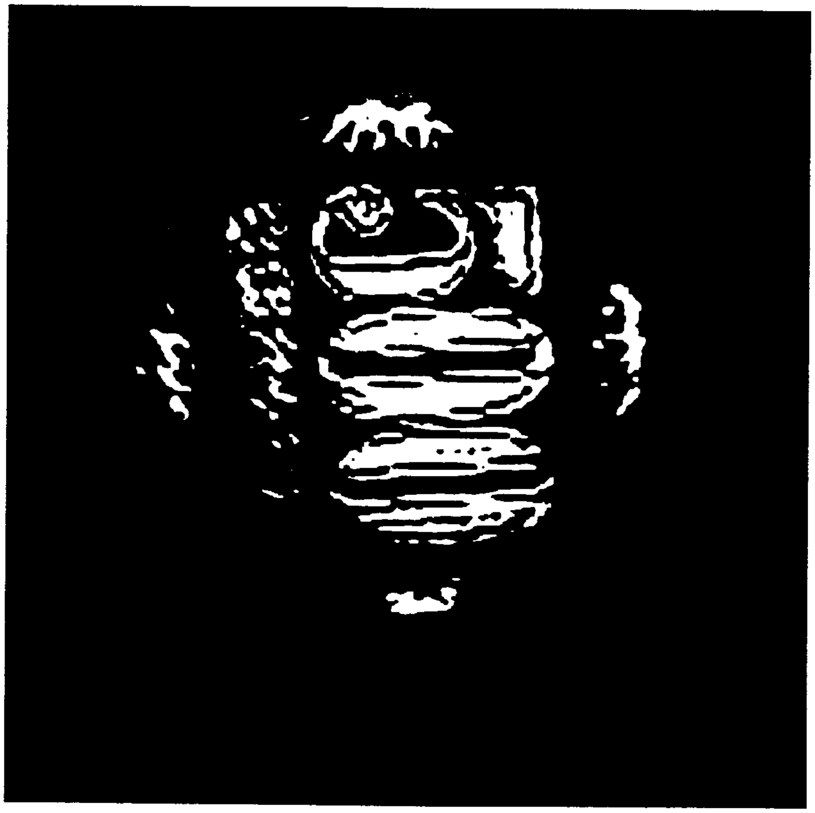
FIG. 29 is an image example (3) used to explain the processing of each part.
Figure 30:
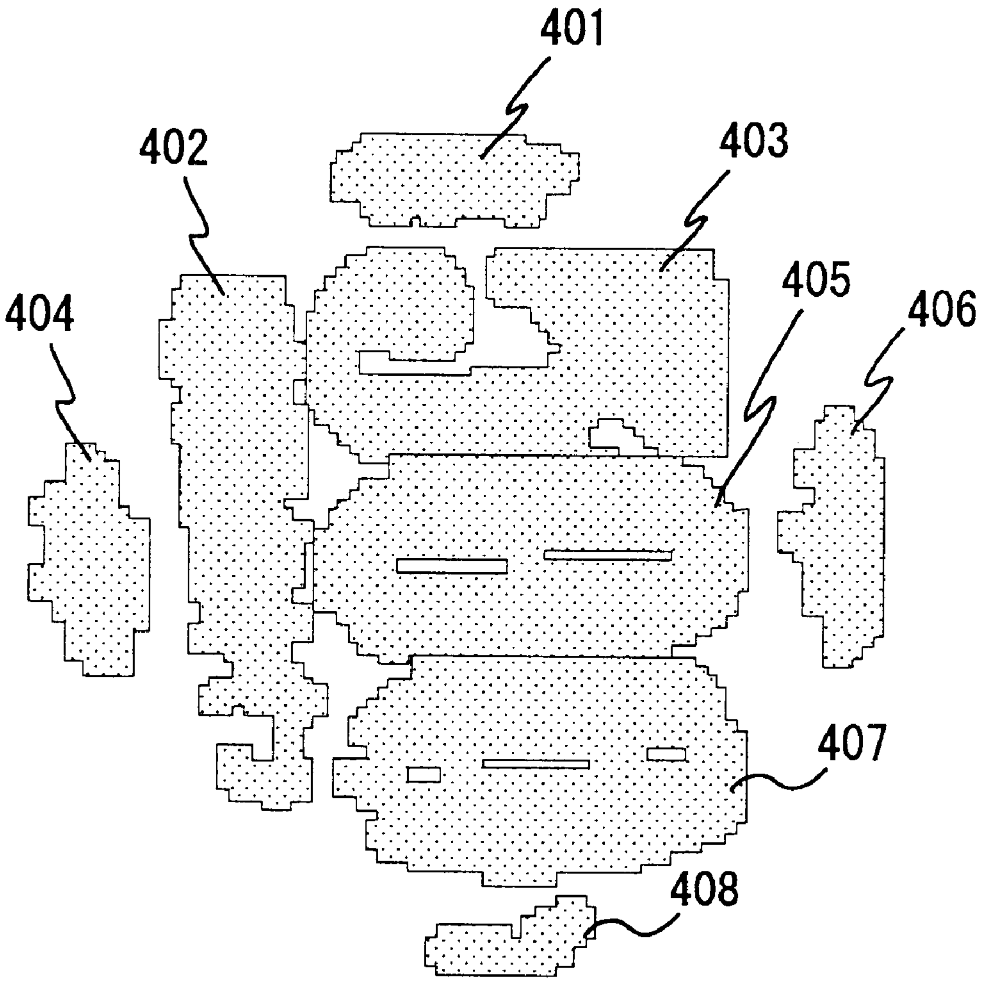
FIG. 30 is an image example (4) used to explain the processing of each part.
Figure 31:
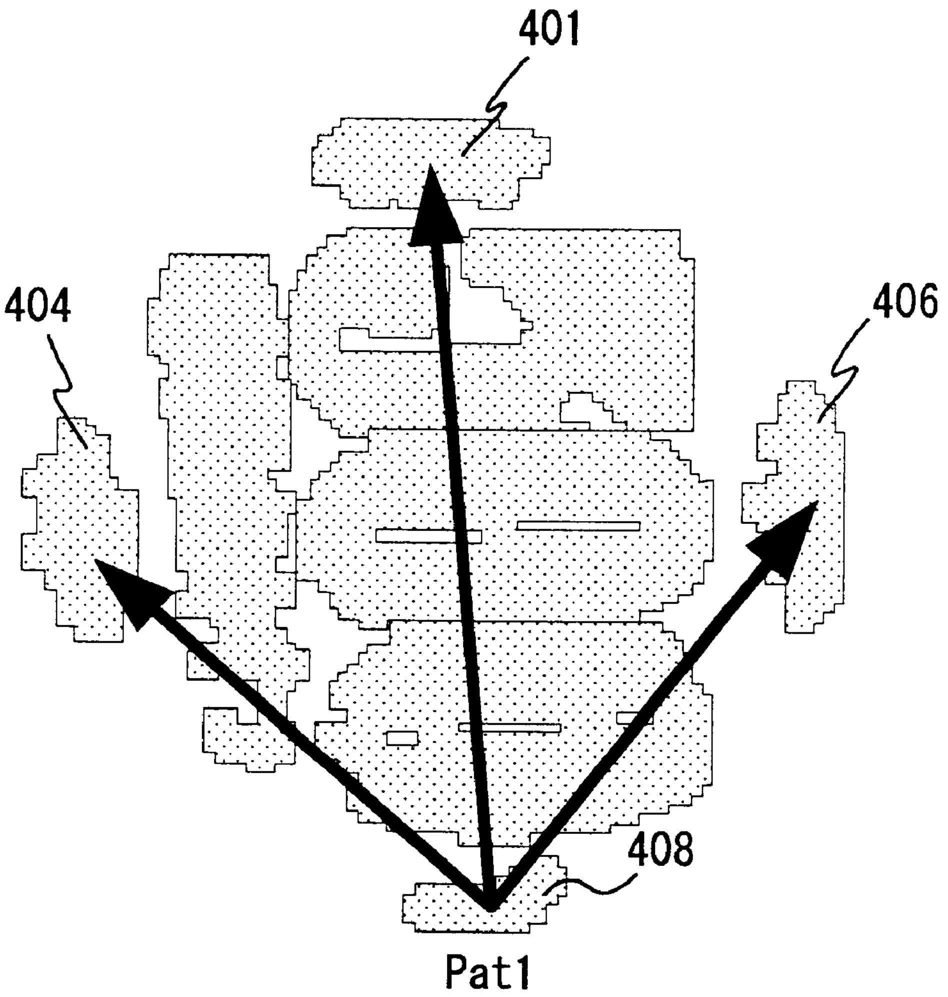
FIG. 31 is an image example (5) used to explain the processing of each part.

The binary conversion unit 32 converts to binary level a multilevel image of the bottom side of the coin as shown in FIG. 27, to obtain the binary image shown in FIG. 28 (step 301). Next, the labeling unit 45 removes the outer perimeter of the binary image as shown in FIG. 29 (step 302), performs labeling, and obtains patterns 401 through 408 as shown in FIG. 30 (step 303). Here, the labeling unit 45 acquires characteristic quantities such as the centers of gravity and areas for the patterns 401 through 408, as well as the coin center, radius, and similar.

Next, candidates for the four leaf-shape patterns are selected by the characteristic extraction unit 46 from the labeled patterns 401 through 408 (step 304). Selection of candidates is performed by ranking in terms of distances from the center of the center of gravity of each pattern; for example, the top five candidates (patterns 404, 403, 401, 408, 406) may be selected as shown in Table 1.

TABLE 1

| Pattern number by labeling | Distance from coin center to center of gravity | Coordinates of center of gravity (taking coin center as origin) X | Y | Area | Leaf-shaped pattern candidate rank |
|---|---|---|---|---|---|
| 1 (404) | 35.0 | −35 | −1 | 177 | 3 |
| 2 (403) | 1.4 | 1 | 1 | 2630 | 5 |
| 3 (401) | 27.0 | −1 | 37 | 179 | 4 |
| 4 (408) | 37.3 | 5 | −37 | 84 | 1 |
| 5 (406) | 36.1 | 36 | 3 | 183 | 2 |

Next, the shape recognition unit 47 eliminates patterns with areas that are too large or too small from the selected candidates, to reduce the number of candidates to four (step 305). For example, pattern 403 (cf Table 1), with too large an area, may be eliminated, to obtain the results shown in Table 2.

TABLE 2

| Pattern number assigned by labeling | Distance from coin center to center of gravity | Coordinates of center of gravity (taking coin center as origin) X | Y | Leaf-shape pattern candidate rank |
|---|---|---|---|---|
| 1 (404) | 35.0 | −35 | −1 | 3 |
| 2 (403) | Not calculated | 1 | 1 | 5 |
| 3 (401) | 27.0 | −1 | 37 | 4 |
| 4 (408) | 37.3 | 5 | −37 | 1 |
| 5 (406) | 36.1 | 36 | 3 | 2 |

In cases where there are fewer than four candidates for leaf-shape patterns (YES in step 306), the coin is judged to be other than a 500 yen coin (step 307), and processing is halted.

Next, the shape recognition unit 47 names one of the four remaining leaf-shape pattern candidates "Pat1" (step 308), and calculates the distance between the centers of gravity of Pat1 and the other three patterns (step 309). For example, the pattern 408 which is ranked first as a leaf-shape pattern candidate may be named Pat1, as shown in Table 3 and FIG. 31, and the distances between the centers of gravity of Pat1 and the other patterns 401, 404, and 406 are computed.

TABLE 3

| Pattern number assigned by labeling | Distance from pat1 to center of gravity | Coordinates of center of gravity (taking coin center as origin) X | Y | Leaf-shape pattern candidate rank |
|---|---|---|---|---|
| 1 (404) | 53.8 | −35 | −1 | 3 |
| 2 (403) | Not calculated | 1 | 1 | 5 |
| 3 (401) | 74.2 | −1 | 37 | 4 |
| 4 <-- Pat1 | 0 | 5 | −37 | 1 |
| 5 (406) | 50.6 | 36 | 3 | 2 |

Figure 32:
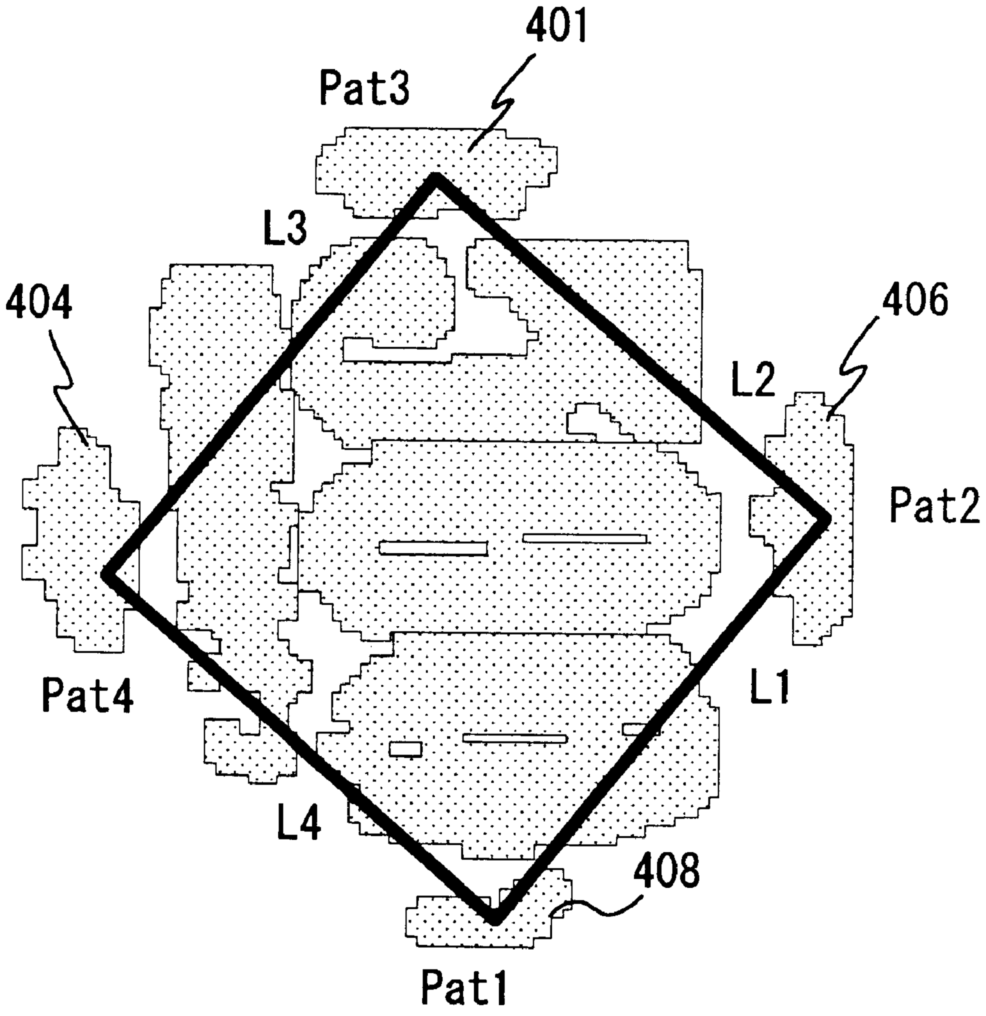
FIG. 32 is an image example (6) used to explain the processing of each part.
Figure 33:
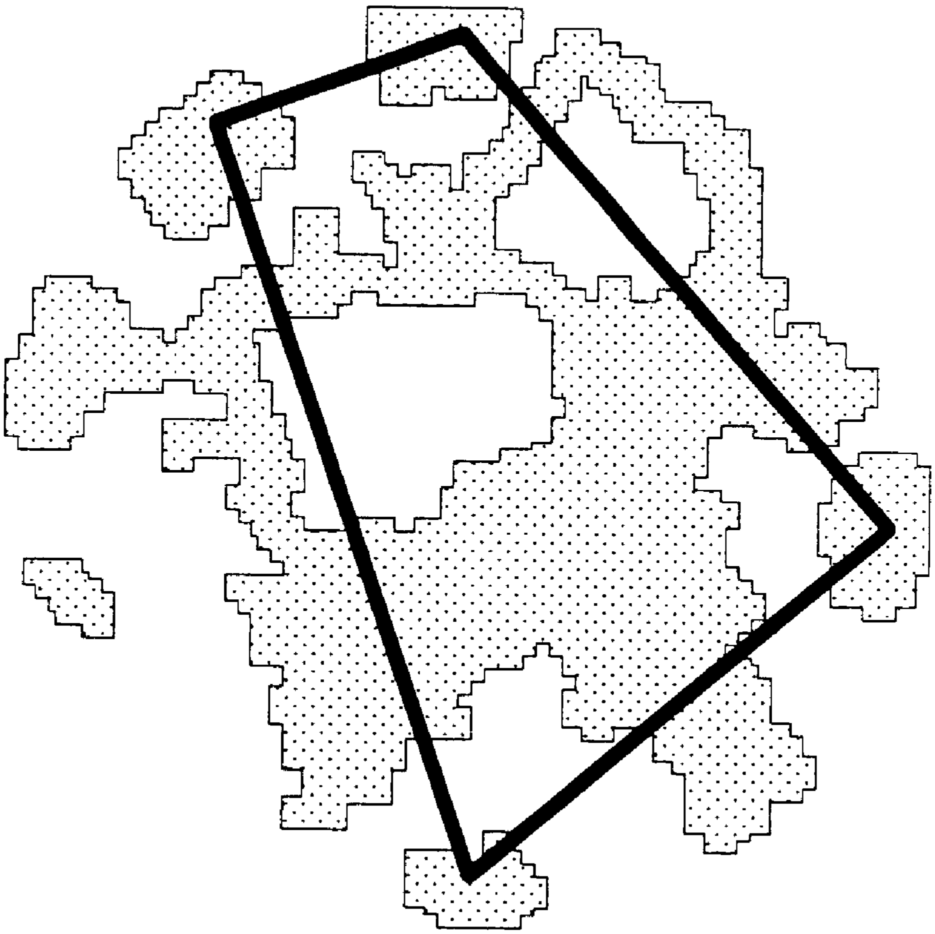
FIG. 33 is an image example (7) used to explain the processing of each part.

Next, the shape recognition unit 47 assigns to the three patterns other than Pat 1 the names "Pat2", "Pat3" and "Pat4" in the counter-clockwise direction from Pat1 (step 310). For example, as shown in FIG. 32, pattern 406 is named Pat2, pattern 401 is named Pat3, and pattern 404 is named Pat4.

Then, the shape recognition unit 47 computes the distance L1 between the centers of gravity of Pat1 and Pat2 (step 311), the distance L2 between the centers of gravity of Pat2 and Pat3 (step 312), the distance L3 between the centers of gravity of Pat3 and Pat4 (step 313), and the distance L4 between the centers of gravity of Pat4 and Pat1 (step 314). The distances L1, L2, L3, L4 are then each normalized by dividing by the radius of the coin (the image radius) (step 315). The results of normalization may for example be as shown in Table 4.

TABLE 4

| Side | Length | Normalized length (ratio to coin radius) | Error with respect to standard value (%) |
|---|---|---|---|
| L1 | 50.6 | 1.01 | 1.7 |
| L2 | 50.2 | 1.00 | 2.5 |
| L3 | 51.0 | 1.02 | 1.0 |
| L4 | 53.8 | 1.08 | 4.5 |
| Standard value | — | 1.03 | 0 |
| Coin radius | 50.0 | 1.00 | — |

The judgment unit 48 judges whether the coin image is the image of the bottom side of a 500 yen coin, based on the normalized values L1, L2, L3, L4 (step 316); if it is judged to be an image of the bottom side (YES in step 317), checks of the area and other parameters for each pattern are performed (step 318).

Area checks are performed by, for example, computing the ratios of the areas of each normalized pattern to the total area of all patterns, as in Table 5, and if the error is greater than or equal to a fixed value, the image is judged not to be an image of the bottom side of a 500 yen coin.

TABLE 5

| Pattern number | Area | Normalized area (ratio to total for all patterns) | Error with respect to standard value (%) |
|---|---|---|---|
| Pat1 | 84 | 0.026 | 50.6 |
| Pat2 | 183 | 0.056 | 7.6 |
| Pat3 | 179 | 0.055 | 5.3 |
| Pat4 | 177 | 0.054 | 4.1 |
| Standard value | — | 0.052 | 0 |
| Total for entire coin | 3253 | 1.00 | — |

As a result of the judgment of step 316, if the image is judged not to be an image of the bottom side of a 500 yen coin (NO in step 317), similar procedures are used (cf. FIG. 33) to check whether the image is an image of the top side of a 500 yen coin (step 319).

In the above explanation, the case in which leaf-shaped patterns on the bottom side and character patterns on the top side of a 500 yen coin are used as characteristic quantities is described; but other patterns can also be used as characteristic quantities.

In the image input unit 2, there is no need to use an optical sensor in order to obtain a two-dimensional image of the protrusions and depressions of a coin surface; a magnetic sensor or other means may be used to obtain two-dimensional information.

Figure 34:
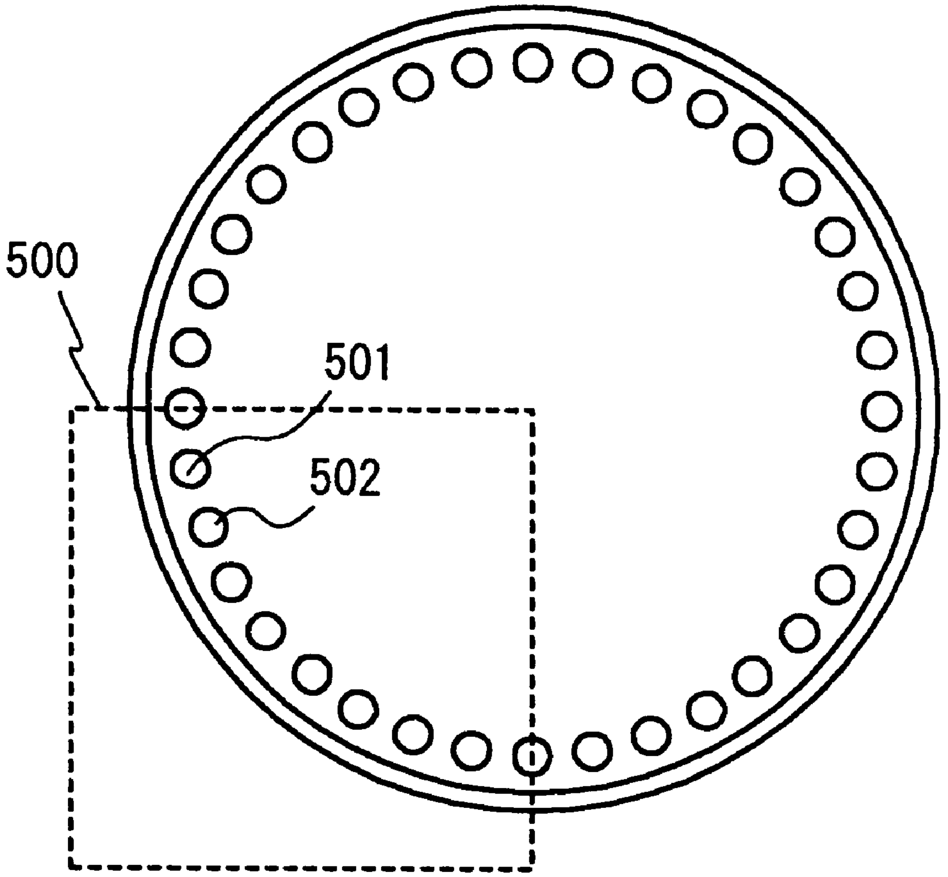
FIG. 34 is a figure showing an example of a characteristic quantity in cases in which a partial image of the coin is used to judge the genuine or counterfeit nature.

The two-dimensional image of the coin surface need not necessarily cover the entire surface; a partial image of a coin, indicated by the frame 500 shown in FIG. 34, can also be used to discriminate between genuine and counterfeit coins. In this case, judgment of the genuine or counterfeit nature can be performed using, as characteristic quantities, the protrusions 501, 502, and similar positioned at constant intervals near the outer perimeter of the coin.

What is claimed is:

1. A coin discrimination device for discriminating a coin rolling along a coin pathway, comprising:

illumination means, placed at a prescribed position on the coin pathway, for illuminating with light for a short time a surface or an edge of the coin rolling along the coin pathway;

image-capture means for capturing an image of the surface or edge of the coin, illuminated with light from the illumination means;

image-capture start indication means, for indicating a start of image capture to the image-capture means in advance, before the coin reaches an image-capture position of the image-capture means; and, light emission indication means, for indicating a start of illumination of light to the illumination means when the coin reaches the image-capture position of the image-capture means.

2. The coin discrimination device according to claim 1, wherein the image-capture start indication means comprises a first sensor, positioned on an upstream side of the illumination means on the coin pathway, and the light emission indication means comprises a second sensor, positioned corresponding to the image-capture means.

3. The coin discrimination device according to claim 1, wherein the coin pathway constitutes a light-blocking space.

4. The coin discrimination device according to claim 1, wherein the image-capture means is a two-dimensional image sensor.

5. The coin discrimination device according to claim 4, wherein the two-dimensional image sensor is a MOS-type image sensor.

6. A coin discrimination device which acquires image information corresponding to a pattern of a top side or a bottom side of a coin to be discriminated which rolls along a coin pathway, and discriminates the coin to be discriminated based on the acquired image information, comprising:

separation means for separating the image information for the top side or the bottom side of the coin to be discriminated into areas set in advance;

specific pattern extraction means for extracting specific patterns from among any of areas separated by the separation means; and, judgment means for comparing specific patterns extracted by the specific pattern extraction means with reference values, and for judging whether or not the coin to be discriminated is a prescribed coin.

7. The coin discrimination device according to claim 6, wherein the image information is a binary image, in which a pattern based on the pattern of the top side or the bottom side of the coin for discrimination is drawn in white or in black, and the separation means separates the pattern by drawing separation lines of a prescribed width, in the color opposite the pattern color, in preset positions in the binary image.

8. The coin discrimination device according to claim 6, wherein the separation means draws, in the image, circles having the same center as the coin for discrimination as the separation lines.

9. The coin discrimination device according to claim 6, wherein the image information corresponds to an image subjected to rotation correction such that the coin to be discriminated faces a prescribed reference direction, and the separation means draws on the image straight lines as separation lines.

10. A coin discrimination device, in which image information corresponding to a pattern on a top side or a bottom side of a coin to be discriminated, rolling along a coin pathway, is acquired, and the coin to be discriminated is discriminated based on the acquired image information, comprising:

specific pattern extraction means for extracting specific patterns from image information for the top side or the bottom side of the coin for discrimination;

pattern-to-pattern distance computation means for computing a distance between at least two specific patterns extracted by the specific pattern extraction means; and, judgment means for judging the coin for discrimination based on the distance calculated by the pattern-to-pattern distance computation means.

11. The coin discrimination device according to claim 10, wherein the pattern-to-pattern distance computation means computes the distance between centers of gravity of the respective specific patterns extracted by the specific pattern extraction means.

12. The coin discrimination device according to claim 10, further comprising angle computation means for computing angles formed by a plurality of line segments joining each of centers of gravity of at least two specific patterns extracted by the specific pattern extraction means with a center of the coin to be discriminated in the image information, and wherein the judgment means judges the coin to be discriminated based on the angles computed by the angle computation means.

13. The coin discrimination device according to claim 10, wherein the specific pattern extraction means comprises image conversion means for converting to binary level the image information for the top side or the bottom side of the coin to be discriminated, and the image conversion means extracts the specific patterns from the binary-level image.

14. The coin discrimination device according to claim 10, wherein the specific pattern extraction means comprises pattern separation means for separating the image information into a plurality of patterns, and area computation means for computing an area of each pattern separated by the pattern separation means; and patterns, areas of which as computed by the area computation means are within a range set in advance, are extracted as the specific patterns.

15. The coin discrimination device according to claim 10, wherein the specific pattern extraction means comprises pattern separation means for separating the image information into a plurality of patterns, and position specification means for specifying positions of patterns separated by the pattern separation means based on a distance between center of gravity of the patterns and a center of the coin to be discriminated in the image information; and patterns, positions of which as specified by the position specification means are within a range set in advance, are extracted as the specific patterns.

16. The coin discrimination device according to claim 10, further comprising normalization means for normalizing the distance between the specific patterns based on a radius of the coin to be discriminated in the image information, and wherein the judgment means judges the coin to be discriminated based on comparison of the distance normalized by the normalization means with a reference value.

* * * * *